「US006839504B1」

(12) United States Patent
Gotoh et al.

(10) Patent No.: US 6,839,504 B1
(45) Date of Patent: Jan. 4, 2005

(54) INFORMATION RECORDING MEDIUM AND SYSTEM CONTROLLER

(75) Inventors: Yoshiho Gotoh, Osaka (JP); Hiroshi Ueda, Hirakata (JP); Miyuki Sasaki, Moriguchi (JP); Yoshihisa Fukushima, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 937 days.

(21) Appl. No.: 09/676,350

(22) Filed: Sep. 29, 2000

(30) Foreign Application Priority Data

Sep. 30, 1999 (JP) .......................................... 11-280857
Sep. 7, 2000 (JP) ...................................... 2000-272263

(51) Int. Cl.[7] .............................................. H04N 7/26
(52) U.S. Cl. ...................... 386/111; 386/46; 386/109; 386/113
(58) Field of Search ........................ 386/46, 109, 111, 386/113

(56) References Cited

U.S. PATENT DOCUMENTS

| 5,751,371 | A  |   | 5/1998  | Shintani       |         |
|-----------|----|---|---------|----------------|---------|
| 6,567,371 | B1 | * | 5/2003  | Otomo et al.   | 369/275.3 |
| 6,625,094 | B1 | * | 9/2003  | Park et al.    | 369/47.14 |
| 6,633,724 | B1 | * | 10/2003 | Hasegawa et al.| 386/113 |

FOREIGN PATENT DOCUMENTS

| EP | 0866456 | 9/1998  |
| EP | 0903742 | 3/1999  |
| EP | 0929072 | 7/1999  |
| EP | 0905699 | 2/2001  |
| JP | 0428061 | 1/1992  |
| JP | 0013728 | 1/2000  |
| JP | 0078519 | 3/2000  |
| WO | 9844508 | 10/1998 |
| WO | 9965026 | 12/1999 |

OTHER PUBLICATIONS

"Universal Disk Format™ Specification", Apr. 3, 1998, Optical Storage Technology Association; XP–002155418; p. 1–141.
"Volume and File Structure for Write–Once and Rewritable Media Using Non–Sequential Recording For Information Interchange", Standard ECMA–167; Third Edition; Jun. 1997; XP–002155419; pp. 1/1–5/8.
European Search Report for application No. 00121575.5–2210; dated Jan. 15, 2001.

* cited by examiner

*Primary Examiner*—Chris Kelley
*Assistant Examiner*—Alicia M. Duggins
(74) *Attorney, Agent, or Firm*—Renner, Otto, Boisselle & Sklar, LLP

(57) ABSTRACT

An information recording medium for recording a real-time file containing real-time data in such a manner that the real-time data is continuously reproducible by a playback reference model, the real-time data including at least one of video data and audio data. The playback reference model includes: a pickup for reading the real-time data from the information recording medium; a buffer memory for temporarily storing the real-time data read by the pickup; and a decoder module for reading the real-time data from the buffer memory for processing. The information recording medium includes a volume space for at least recording in sectors a file containing data and file management information for managing the file. The real-time data is recorded in at least two real-time extents each of which is allocated in logically contiguous sectors within the volume space. An $(1+1)^{th}$ real-time extent among the at least two real-time extents is positioned at a position satisfying a real-time reproduction condition.

6 Claims, 19 Drawing Sheets

Vin: Data transfer rate from disk to buffer memory
Vout: Data transfer rate from buffer memory to decoder module TZ: Zone boundary access time
TS: Single sector latency △ :ECC block boundary

FIG. 7A

File entry

| BP | Field name |
|---|---|
| 0 | Descriptor tag |
| 16 | ICB tag |
| ... | ... |
| 56 | Information length |
| ... | ... |
| 112 | Extended attribute ICB |
| ... | ... |
| 168 | Extended attribute length (=L_EA) |
| 172 | Length of allocation descriptor |
| 176 | Extended attribute |
| L_EA+176 | Short allocation descriptor for RT1 |
| L_EA+184 | Short allocation descriptor for RT2 |
| L_EA+192 | Short allocation descriptor for RT3 |
| L_EA+200 | Short allocation descriptor for RT4 |
| L_EA+208 | Short allocation descriptor for RT5 |
| L_EA+216 | Short allocation descriptor for RT6 |
| L_EA+224 | Short allocation descriptor for empty extent |

ICB tag

| RBP | Field name |
|---|---|
| ... | |
| 11 | File type (=249) |
| ... | |
| 18 | Flag bit4=ONE (Non-relocatable bit) |

Extended attribute for allocation

| RBP | Field name |
|---|---|
| 0 | Vin |
| 2 | Vout |
| 4 | Buffer memory size |
| 6 | Access type |
| 8 | Ta |
| 10 | Tb |
| 12 | Tc |

FIG. 7B

Short allocation descriptor

| RBP | Field name |
|---|---|
| 0 | Extent length |
| 4 | Extent location |

FIG. 7C

Meanings of 2 most significant bits of extent length

| Value | Meaning |
|---|---|
| 0 | Allocated and recorded (real-time extent) |
| 1 | Allocated but unrecorded (empty extent) |
| 3 | Extent of subsequent allocation descriptor |

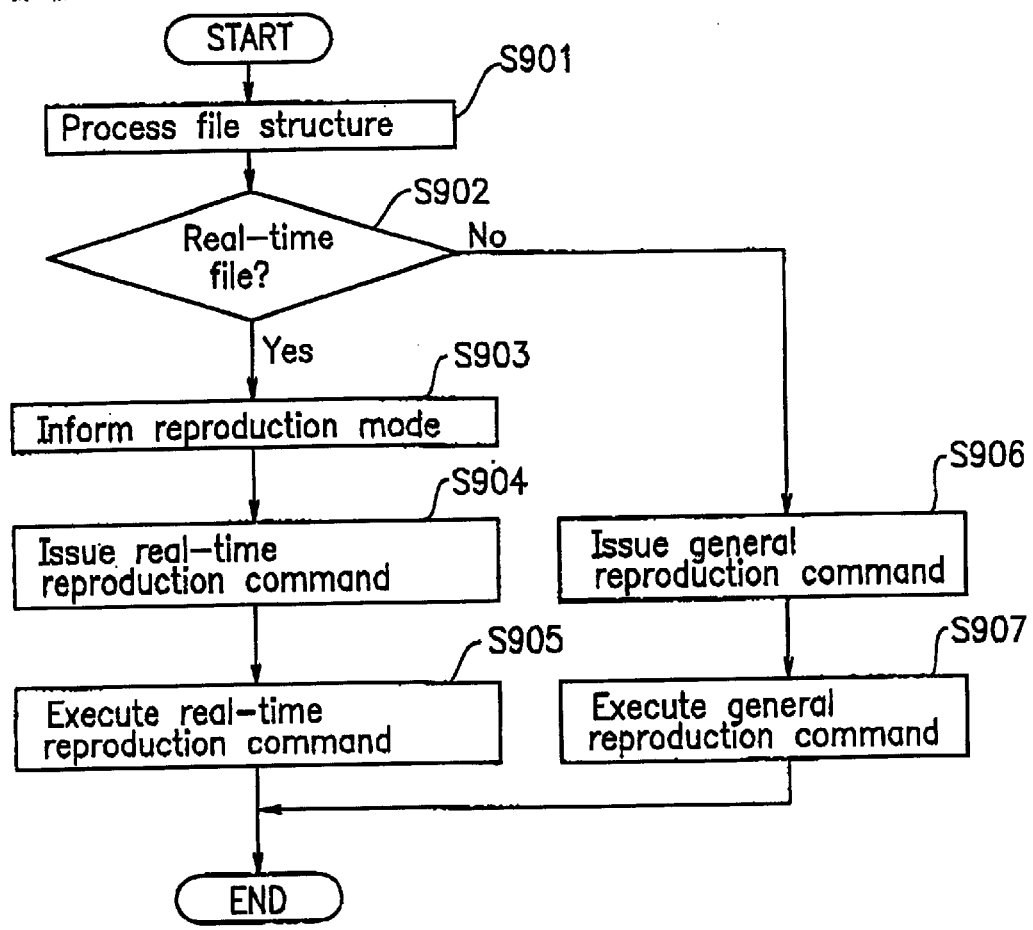

Vin: Data transfer rate from disk to buffer memory
Vout: Data transfer rate from buffer memory to decoder module TS: Single sector latency △ : ECC block boundary △ :ECC block boundary

INFORMATION RECORDING MEDIUM AND SYSTEM CONTROLLER

BACKGROUND OF THE INVENTION

1. Field of the Invention

The present invention relates to an information recording medium for recording general data (e.g., programs) and/or real-time data (e.g., video data and/or audio data) thereon on a sector-by-sector basis; a method for recording data on the information recording medium; a method for reproducing data on the information recording medium: and a system controller, an information recording apparatus, and an information reproduction apparatus for performing such methods.

2. Description of the Related Art

Optical disks are representative of information recording media having a sector structure. The recent trend for higher density, larger capacity, and multimedia technologies has shad light on optical disks as information media for use with personal computers and various consumer use apparatuses.

Hereinafter, by referring to the accompanying figures, a DVD-RAM disk will be described as an example of a conventional rewritable optical disk. FIG. 16A illustrates the physical layout of a conventional rewritable optical disk of a ZCLV (zoned constant linear velocity) format.

An shown in FIG. 16A, the rewritable disk includes a lead-in area, a DMA (defect management area), a data area, and a lead-out area, in this order from the inner periphery to the outer periphery. The DMA is used for managing defective sectors on the disk. Each area has digital data recorded therein. The digital data is managed in units which are commonly referred to as sectors. The data area includes a spare area used for replacing a defective sector in a replacement process, as well as regions denoted as zones 0 to 34. In each zone, data is recorded in physical sectors which are 2048 bytes long.

As shown in FIG. 16B, information areas on the rewritable optical disk have physical sector numbers (PSN) assigned thereto. User data maybe recorded in a space which is defined as a volume space including logical sectors to which logical sector numbers (LSN) are assigned. Stated otherwise, the volume space is the information area minus the lead-in area, the DMA, the unused regions within the spare area, any number of defective sectors which are registered in a primary defect list (PDL) within the DMA, guard regions in between the respective zones, and the lead out region. In order to provide improved data reliability, an error correction process is performed on an ECC block-by-ECC block basis, where each ECC (error correction code) block is composed of 16 logical sectors.

Any defective sectors which have been detected through a certify process performed at the time of initialization of the disk are registered In the PDL, so that these defective sectors will not receive any LSNs assigned thereto. Therefore, it is possible that sectors of consecutive logical addresses may include regions which are not in a physically consecutive order. Any defective sectors which are detected during data recording are subjected to a linear replacement whereby the entire ECC block containing each defective area is replaced by a spare region, and are registered in a secondary defect list (SDL) within the DMA. Thus, a rewritable disk is provided with a mechanism for improving data reliability.

As described above, a DVD-RAM disk, which is provided with a defect management mechanism, is subjected to a defect management process by a drive. On the other hand, a CD-RW disk which is not provided with any defeat management mechanism, is subjected to a defect management process—similar to the aforementioned SDL-based defect management—which is performed by a file system based on a sparing table as defined under the UDF® (universal disk format) specification of OSTA. Specifically, in the case of CD-RW disks, the entire ECC block including a defective sector is replaced by a spare area which is set within the volume space, and this replacement information is managed based on a sparing table as defined under the UDF specification.

Next, as an example of a conventional write-once optical disk, a 3.95 Gbyte DVD-R as specified under the DVD-R Standards (Version 1.0) will be described. It is assumed that the volume/file structures conform to the data structures defined under the ISO/IEC 13346 Standards or the UDF specification, unless otherwise specified.

FIG. 17 illustrates an exemplary directory structure to be recorded on an optical disk. Under a ROOT directory 201 is recorded a REALTIME directory 202, which to dedicated to video applications. Under the REALTIME directory 202, audio/video data (hereinafter referred to as "AV data") which has been compressed in the MPEG format is recorded in a file named VIDEO.VRO file 203. A number of still picture files which have been recorded by means of a digital camera or the like are recorded in a file named FILEA.DAT 204.

FIGS. 18A to 18C are diagrams illustrating extent locations In the case where AV data is appended to the VIDEO.VRO file. As used herein, an "extent " means a region containing logically contiguous sectors in which data is recorded.

When AV data is recorded a linking loss area 561 (32 KB) is first recorded, and thereafter AV data is recorded in an extent 562, and furthermore a padding area 563, in which 00h data is recorded, is recorded in the sectors up to the ECC block boundary. In the case of DVD disks, an ECC error correction in performed in units of 16 sectors, so that data recording also occurs in units of 16 sectors. Next, a file structure concerning this DVD-R disk is recorded. After a border-out (not shown) is recorded so as to enable reading by a read-only system, a recording area will be formed after the padding area 563. The border-out has a size of 10 to 100 MB.

In the case of a DVD-R disk in which data is sequentially recorded, AV data will be sequentially appended, beginning from the inner periphery of an unrecorded area which is left in the outer periphery of the disk. Therefore, in a second append operation, as shown in FIG. 18D, after a linking loss area 564, AV data is recorded in an extent 565, and a padding area 566 is recorded in the sectors up to the ECC block boundary.

Similarly, an shown in FIG. 18C, in a third AV data append operation, a linking loss area 567, an extent 568, and a padding area 569 are recorded. Thus, AV data is appended in split portions over a number of extents.

Next a linking scheme for DVD-R disks will be described with reference to FIGS. 19A to 19D. A so-called "buffer underrun" occurs due to the difference between the data rate of the AV data to be recorded and the data rate when the data is recorded on the disk by the pickup. If a buffer underrun occurs, the drive temporarily suspends the recording, and resumes recording after a predetermined amount of data is stored within the buffer. At this time, the linking scheme forms a linking loss area.

FIG. 19A is a diagram illustrating extent locations in the case where two buffer underruns occur during AV data recording. Extents 222, 223, and 224 represent areas in which AV data has been recorded. A linking loss area 220 is an area which is recorded prior to the recording of AV data. Linking loss areas 226 and 227 are areas which are recorded responsive to the buffer underruns.

FIGS. 19B and 19C are sector-by-sector illustrations of area structures. The linking loss area 220 is recorded by recording 00h data s as to begin in the middle of the first sector and reach the end of the 16 th sector. If an ensuing extent 222 is to be recorded, the extent 222 is recorded from the beginning of the first sector up to the beginning in the next sector adjoining this extent, and the recording operation is finished for the time being. Next, when the linking loss area 226 is to be recorded, the recording is resumed in the middle of the first sector. Thus, since a data append operation for DVD-R disks occurs in the middle of a sector, any sector that contains areas which are adjoined by the linking scheme is referred to as a linking sector 225.

The specific linking scheme to be performed within a linking sector is illustrated in FIG. 19D. One sector consists of 26 sync frames. Reference numerals 241, 242, 243, and 244 represent areas which are recorded at an end portion when the extent 222 is recorded, 241 and 242 represent a sync portion and a data portion, respectively, of a first sync frame; and 243 and 244 represent a sync portion and a data portion, respectively, of a second sync frame. The data portions 242 and 244 are sized so as to be able to allow 91 bytes and 86 bytes of data, respectively, to be recorded therein. An area 245 and the following areas represent areas which are formed within the first sector of the ECC block in the linking loss area 226 when the extent 223 is recorded. Reference numeral 245 represents a data portion in the second sync frame. Reference numerals 246 and 247 represent sync portions in sync frames.

Data 00h is recorded in a runout area 228 so as not to be finalized at the time of recording the extent 222. A region 229 spanning from the 82nd byte to the 87 bytes in the second sync frame is a region which overwrites a previously recorded area through appending; this area is referred to as a linking gap because no valid data can be recorded therein. Thus, the linking sector 225 containing the linking gap 229 is subject to the physical constraint that data cannot be properly recorded therein. Therefore, the 32 KB ECC block containing this linking sector is defined as a linking loss area so as to ensure that any data that requires reliability is prevented from being recorded therein as valid data.

However, in the case where real-time data is reproduced from an optical disk having the aforementioned format with the real-time data being recorded thereon, it is difficult to continuously reproduce the recorded real-time data because access may have to occur to physically non-contiguous areas which are formed between or within extents.

In particular, in the case where data is recorded in a conventional file system, the data reproduction may be interrupted due to a data read delay occurring when accessing a guard area provided in the vicinity of a zone boundary, a read delay arising from any defective sectors or defective blocks that are registered in the PDL or SDL, and/or a data read delay arising from bouncing from one recording area to another to access data recorded In a plurality of discrete, empty areas.

Since it is currently impossible to distinguish real-time files from general files, once an error occurs during the reproduction of real-time data, a delay may occur in order to again reproduce a location which was not successfully reproduced previously.

Since no identification information is currently available to show conditions for reproducing real-time data and the fact that given real-time data was in fact recorded under such conditions, it is impossible to know whether or not the recorded real-time data can be continuously reproduced.

In the case where a recording apparatus appends real-time data to an already-recorded real-time file, it may not be possible to achieve continuous data reproduction between the end portion of the already-recorded data and the beginning portion of the appended data.

In the case of real-time data which has been encoded by the MPEG method, it may not be possible to achieve continuous data reproduction between the end portion of the already-recorded data and the beginning portion of the appended data due to differing encoding conditions.

In the case of an optical disk to which data is recorded while using a linking scheme, e.g., a DVD-R disk, a linking loss area which is 32 KB long is formed every time a buffer underrun occurs. This causes each area in which data in recorded to be split into a plurality of extents, resulting in a large amount of address information being associated with each extent to be managed by the file system, making it difficult to reproduce the data by means of a reproduction-only apparatus with a limited memory size. Moreover, when AV data having a low data rate is recorded, linking loss areas to be recorded will account for a large proportion, resulting in a poor recording efficiency.

SUMMARY OF THE INVENTION

According to one aspect of the present invention, there is provided an information recording medium for recording a real-time file containing real-time data in such a manner that the real-time data is continuously reproducible by a playback reference model, the real-time data including at least one of video data and audio data, wherein the playback reference model includes: a pickup for reading the real-time data from the information recording medium; a buffer memory for temporarily storing the real-time data read by the pickup; and a decoder module for reading the real-time data from the buffer memory for processing, wherein the information recording medium includes a volume space for at least recording in sectors a file including data and file management information for managing the file; the real-time data to recorded in at least two real-time extents each of which in allocated in logically contiguous sectors within the volume space; and an $(i+1)^{th}$ real-time extent among the at least two real-time extents is positioned at a position satisfying a real-time reproduction condition defined ass $T(i) \leq (B(i-1)+D(i))/Vout$, wherein: $T(i)$ represents a time required for the pickup to access from an end of an $i^{th}$ real-time extent among the at least two real-time extents to a beginning of the $(i+1)^{th}$ real-time extent; $B(i)$ represents an amount of data having been stored in the buffer memory when the pickup accesses from the end of the $i^{th}$ real-time extent to the beginning of the $(i+1)^{th}$ real-time extent, such that $B(i) =B(i-1)+D(i)-Vout \times T(i)$, assuming that $B(0)=0$, $D(i)$ represents an increase in the amount of data having been stored in the buffer memory responsive to the pickup reading the data from the $i^{th}$ real-time extent, such that $D(i)=(Vin-Vout) \times s(i)/Vin$, wherein D(i) is corrected at least to a value equal to or smaller than $M-B(i-1)$ when $D(i) > M-B(i-1)$ where M represents a size of the buffer memory; Vout represents a data transfer rate when the data is transferred from the buffer memory to the decoder module; Vin represents a data transfer rate when the data is read from each of the at least two real-time extents by the pickup and transferred to the buffer memory; and S(i) represents a data size of the $i^{th}$ real-time extent.

In one embodiment of the invention, D(i) is corrected so that D(i)=(Vin−Vout)×S(i)/Vin+B(i−1) −k×(Vout×Tk) when D(i)>M−B(i−1), wherein: Tk represents a maximum rotation wait time of the information recording medium; and k represents an integer portion of ((D(i)+B(i−1)−M)/(Vout× Tk)+1).

In another embodiment of the invention, each of the at least two real-time extents is allocated in physically contiguous sectors.

In still another embodiment of the invention, the is file management information includes location information indicating each of the at least two real-time extents.

In still another embodiment of the invention, the file management information includes first identification information for identifying the real-time file including real-time data.

In still another embodiment of the invention, the file management information includes second identification information for indicating that the at least two real-time extents are positioned in accordance with the real-time reproduction condition.

In still another embodiment of the invention, the file management information includes, as an extended attribute, information representing a condition under which the at least two real-time extents were positioned.

Alternatively, there is provided an information recording medium for recording a real-time file containing real-time data in such a manner that the real-time date is continuously reproducible by a playback reference model, the real-time data including at least one of video data and audio data, wherein the playback reference model includes: a pickup for reading the real-time data from the information recording mediums a buffer memory for temporarily storing the real-time data read by the pickup; and a decoder module for reading the real-time data from the buffer memory for processing, wherein the information recording medium includes a volume space for at least recording in sectors a file including data and file management information for managing the file; the real-time data is recorded in at least two real-time extents each of which is allocated in logically contiguous sectors within the volume space; and an $(i+1)^{th}$ real-time extent among the at least two real-time extents is positioned at a position satisfying a real-time reproduction condition defined ass T(i)≦(B(i−1)+D(i))/Vout, wherein: T(i) represents a time required for the pickup to access from an and of an $i^{th}$ real-time extent among the at least two real-time extents to a beginning of the $(i+1)^{th}$ real-time extent; B(i) represents an amount of data having been stored in the buffer memory when the pickup accesses from the end of the $i^{th}$ real-time extent to the beginning of the $(i+1)^{th}$ real-time extent, such that B(i) =B(i−1)+D(i)+Vout×T(i), assuming that B(0)=0, D(i) represents an increase in the amount of data having been stored in the buffer memory responsive to the pickup reading the data from the $i^{th}$ real-time extent, such that D(i) (Vin −Vout)×S (i)/Vin, wherein D(i) is corrected at least to a value equal to or smaller than M−B(i−1) when D(i) >M−B(i−1), where M represents a size of the buffer memory; Vout represents a data transfer rate when the data is transferred from the buffer memory to the decoder module; Vin represents a data transfer rate when the data is read from each of the at least two real-time extents by the pickup and transferred to the buffer memory: and S(i) represents a data size of the $i^{th}$ real-time extent, wherein the real-time file is a file in which the real-time data is appended; and wherein data of an already recorded real-time extent is recorded in a newly recorded real-time extent.

In one embodiment of the invention, D(i) is corrected so that D(i)=(Vin−Vout)×S(i)/Vin+B(i−1) −k×(Vout×TK) when D(i) >M−B(i−1), wherein: TK represents a maximum rotation wait time of the information recording medium: and k represents an integer portion of ((D(i)+B(i−1)−M)/(Vout× Tk)+1).

In another embodiment of the invention, each of the at least two real-time extents is allocated in physically contiguous sectors.

In still another embodiment of the invention, the file management information includes location information indicating each of the at least two real-time extents.

In still another embodiment of the invention, the file management information includes first identification information for identifying the real-time file including real-time data.

In still another embodiment of the invention, the file management information includes second identification information for indicating that the at least two real-time extents are positioned in accordance with the real-time reproduction condition.

In still another embodiment of the invention, the file management information includes, as an extended attribute, information representing a condition under which the at least two real-time extents were positioned.

Alternatively, there is provided an information recording medium for recording a real-time file containing real-time data in such a manner that the real-time data is continuously reproducible by a playback reference model, the real-time data including at least one of video data and audio data, wherein the playback reference model includes: a pickup for reading the real-time data from the information recording medium; a buffer memory for temporarily storing the real-time data read by the pickup and a decoder module for reading the real-time data from the buffer memory for processing, wherein the information recording medium includes a volume space for at least recording in sectors a file including data and file management information for managing the file; the real-time data is recorded in at least two real-time extents each of which is allocated in logically contiguous sectors within the volume space; and an $(i+1)^{th}$ real-time extent among the at least two real-time extents is positioned at a position satisfying a real-time reproduction condition defined as; T(i)≦(B(i−1)+D(i))/Vout, wherein: T(i) represents a time required for the pickup to access from an and of an $i^{th}$ real-time extent among the at least two real-time extents to a beginning of the $(i+1)^{th}$ real-time extent; B(i) represents an amount of data having been stored in the buffer memory when the pickup accesses from the end of the $i^{th}$ real-time extent to the beginning of the $(i+1)^{th}$ real-time extent, such that B(i) =B(i−1)+D(i)−Vout×T(i), assuming that B(0)=0, D(i) represents an increase in the amount of data having been stored in the buffer memory responsive to the pickup reading the data from the $i^{th}$ real-time extent, such that D(i)=(Vin −Vout)×S(i)/Vin, wherein D(i) is corrected at least to a value equal to or smaller than M−B(i−1) when D(i) >M−B(i−1), where M represents a size of the buffer memory; Vout represents a data transfer rate when the data is transferred from the buffer memory to the decoder module; Vin represents a data transfer rate when the data is read from each of the at least two real-time extents by the pickup and transferred to the buffer memory; and S(i) represents a data size of the $i^{th}$ real-time extent, wherein the real-time file is a file in which the real-time data is appended; wherein the real-time data is compressed in an MPEG format; and wherein data including one or more GOPs recorded at an end of the real-time file before appending is re-encoded and is recorded in a newly recorded real-time extent.

In one embodiment of the invention, D(i) is corrected so that $D(i)=(Vin-Vout)\times S(i)/Vin+B(i-1) -k\times(Vout\times Tk)$ when $D(i)>M-B(i-1)$, wherein: Tk represents a maximum rotation wait time of the information recording medium; and k represents an integer portion of $((D(i)+B(i-1)-M)/(Vout\times Tk)+1)$.

In another embodiment of the invention, each of the at least two real-time extents is allocated in physically contiguous sectors.

In still another embodiment of the invention, the file management information includes location information indicating each of the at least two real-time extents.

In still another embodiment of the invention, the file management information includes first identification information for identifying the real-time file including real-time data.

In still another embodiment of the invention, the file management information includes second identification information for indicating that the at least two real-time extents are positioned in accordance with the real-time reproduction condition.

In still another embodiment of the invention, the file management information includes, as an extended attribute, information representing a condition under which the at least two real-time extents were positioned.

Alternatively, there is provided an information recording medium including a volume space for at least recording in sectors a file including data and file management information for managing the file, wherein: the data includes real-time data, the real-time data including at least one of video data and audio data; the real-time data is recorded in at least one real-time extent each of which is allocated in logically contiguous sectors within the volume space; the file includes at least one real-time extent; a linking lose extent is positioned before each of the at least one real-time extent; and a linking gap is formed in the at least one real-time extent.

In one embodiment of the invention, the linking loss extent includes one ECC block.

In another embodiment of the invention, the file management information includes location information indicating each of the at least one real-time extent.

In still another embodiment of the invention, the file management information includes identification information for Identifying the real-time file including real-time data.

In still another embodiment of the invention, a data type bit to recorded in an area for recording physical additional information concerning each sector within the linking loss extent, the data type bit being used for is identifying the linking lose extents and wherein the data type bit for the sector is set to 1 if a next sector is included within the linking loss extent, unless the sector is a linking sector.

In still another embodiment of the invention, wherein a runout area is formed before the linking gap; and the real-time data is recorded in the runout area within the linking loss extent.

According to another aspect of the present invention, there is provided, a method for recording a real-time file containing real-time data on an information recording medium in such a manner that the real-time data is continuously reproducible by a playback reference model, the real-time data including at least one of video data and audio data, wherein the playback reference model includes: a pickup for reading the reel-time data from the information recording medium; a buffer memory for temporarily storing the real-time data read by the pickup; and a decoder module for reading the real-time data from the buffer memory for processing, wherein the information recording medium includes a volume space for at least recording in sectors a file including data and file management information for managing the file, the real-time data is recorded in at least one real-time extent each of which is allocated in logically contiguous sectors within the volume space, wherein the method includes the steps oft searching for at least two areas satisfying a real-time reproduction condition from among a plurality of logically contiguous unused areas within the volume space, each of the at least two areas being designated an a pre-allocated area, an (i+1)th pre-allocated area among the at least two areas satisfying the real-time reproduction condition being defined as: $T(i) \leq (B(i-1)+D(i))/Vout$, wherein: T(i) represents a time required for the pickup to access from an end of an $i^{th}$ pre-allocated area among the at least two pre-allocated areas to a beginning of the $(i+1)^{th}$ pre-allocated area; B(i) represents an amount of data having been stored in the buffer memory when the pickup accesses from the end of the $i^{th}$ pre-allocated area to the beginning of the $(i+1)^{th}$ pre-allocated area, such that $B(i)=B(i-1)+D(i)-Vout\times T(i)$, assuming that B(0)=0, D(i) represents an increase in the amount of data having been stored in the buffer memory responsive to the pickup reading the data from the $i^{th}$ pre-allocated area, such that $D(i)=(Vin-Vout)\times S(i)/Vin$, wherein D(i) is corrected at least to a value equal to or smaller than $M-B(i-1)$ when $D(i)>M-B(i-1)$, where M represents a size of the buffer memory; Vout represents a data transfer rate when the data is transferred from the buffer memory to the decoder module; Vin represents a data transfer rate when the data is read from the pre-allocated area by the pickup and transferred to the buffer memory; and S(i) represents a data size of the $i^{th}$ pre-allocated area; recording the real-time data in the pre-allocated area; designating a set of logically contiguous sectors in which real-time data is recorded as a real-time extent; and recording the file management information for managing the real-time data as the real-time file.

In one embodiment of the invention, D(i) is corrected so that $D(i)=(Vin-Vout)\times S(i)/Vin+B(i-1) -k\times(Vout\times Tk)$ when $D(i)>M-B(i-1)$, wherein: Tk represents a maximum rotation wait time of the information recording medium; and k represents an integer portion of $((D(i)+B(i-1)-M)/(Vout\times Tk)+1)$.

In another embodiment of the invention, each of the at least one pre-allocated area is allocated in physically contiguous sectors on an ECC block-by-ECC block basis.

In still another embodiment of the invention, the file management information includes location information indicating each of the at least two real-time extents.

In still another embodiment of the invention, the file management information includes first identification information for identifying the real-time file including real-time data.

In still another embodiment of the invention, the file management information includes second identification information for indicating that the at least two real-time extents are positioned in accordance with the real-time reproduction condition.

In still another embodiment of the invention, the file management information includes, as an extended attribute, information representing a condition under which the at least two real-time extents were positioned.

Alternatively, there is provided a method for recording a real-time file containing real-time data on an information recording medium in such a manner that the real-time data is continuously reproducible by a playback reference model, the real-time data including at least one of video data and audio data, wherein the playback reference model includes: a pickup for reading the real-time data from the information recording medium; a buffer memory for temporarily storing the real-time data reads by the pickup; and a decoder module for reading the real-time data from the buffer memory for processing, wherein the information recording medium includes a volume space for at least recording in sectors a file including data and file management information for managing the file, the real-time data is recorded in at least one real-time extent each of which is allocated in logically contiguous sectors within the volume space, wherein the method includes the steps of: calculating whether or not each of the at least one real-time extent will cause an overflow in an amount of data stared in the buffer memory if the real-time extent is reproduced by the playback reference model; when it is calculated that the real-time extent will cause an overflow, correcting the amount of data stored in the buffer memory to equal to or smaller than the size of the buffer memory; calculating whether or not an underflow will occur in the amount of data stored in the buffer memory if the playback reference model accesses from the real-time extent to a newly-allocated pre-allocated area: when it is calculated that an underflow will occur, searching for a real-time extent which will not cause an underflow, on accessing from the real-time extent to the pre-allocated area; recording in the newly-allocated pre-allocated area the real-time data already recorded in the real-time extent which will cause an underflow; recording real-time data to be appended in the newly-allocated pre-allocated area; designating a set of logically contiguous sectors in which real-time data it recorded as a real-time extent; and recording the file management information.

In one embodiment of the invention, each of the at least one pre-allocated area is allocated in physically contiguous sectors on an ECC block-by-ECC block basis.

In another embodiment of the invention, the file management information includes location information indicating each of the at least one real-time extent.

In still another embodiment of the invention, the file management information includes first identification information for identifying the real-time file including real-time data.

In still another embodiment of the invention, the file management information includes second identification information for indicating that the at least two real-time extents are positioned in accordance with the real-time reproduction condition.

In still another embodiment of the invention, the file management information includes, as an extended attribute, information representing a condition under which the at least two real-time extent were positioned.

According to yet another aspect of the present invention, there is provided a method for appending a real-time file containing real-time data on an information recording medium in such a manner that the real-time data is continuously reproducible by a playback reference model, the real-time data including at least one of video data and audio data, wherein the playback reference model includes: a pickup for reading the real-time data from the information recording medium: a buffer memory for temporarily storing the real-time data read by the pickup; and a decoder module for reading the real-time data from the buffer memory for processing, wherein the information recording medium includes a volume space for at least recording in sectors a file including data and file management information for managing the file, the real-time data is recorded in at least one real-time extent each of which is allocated in logically contiguous sectors within the volume space, wherein the real-time file includes data which is compressed in an MPEG format, wherein the method includes the steps of: reading data recorded at an end of the real-time file before appending, the data including one or more GOPs re-encoding the data which has been read; recording the re-encoded data in a newly allocated pre-allocated area; recording real-time data to be appended in the newly-allocated pre-allocated area; designating a set of logically contiguous sectors in which real-time data is recorded as a real-time extent; and recording the file management information.

In one embodiment of the invention, each of the at least one pre-allocated area is allocated in physically contiguous sectors on an ECC block-by-ECC block basis.

In another embodiment of the invention, the file management information includes location information indicating each of the at least one real-time extent.

In still another embodiment of the invention, the file management information includes first identification information for identifying the real-time file including real-time data.

In still another embodiment of the invention, the file management information includes second identification information for indicating that the at least two real-time extents are positioned in accordance with the real-time reproduction condition.

In still another embodiment of the invention, the file management information includes, as an extended attribute, information representing a condition under which the at least two real-time extents were positioned.

Alternatively, there is provided a method for recording information on an information recording medium including a volume space for at least recording in sectors a file including data and file management information for managing the file, including the steps of; determining whether or not the file is a real-time file containing real-time data; recording the file management information in the volume space; recording the real-time data next to a linking loss extent if the file is determined to be a real-time file; and responsive to a buffer underrun occurring during the recording of the real-time data, forming a linking gap in a real-time extent in which the real-time data is recorded.

In one embodiment of the invention, the linking loss extent includes one ECC block.

In another embodiment of the invention, the file management information includes location information indicating each real-time extent.

In still another embodiment of the invention, the file management information includes identification information for identifying the real-time file including real-time data.

In still another embodiment of the invention, a data type bit is recorded in an area for recording physical additional information concerning each sector within the linking lose extent, the data type bit being used for identifying the linking lose extent; and wherein the data type bit for the sector is set to 1 if a next sector is included within the linking loss extent, unless the sector is a linking sector.

In still another embodiment of the invention, the method further includes a step of recording the real-time data in a runout area within the linking loss extent.

According to yet another aspect of the present invention, there in provided an information recording apparatus for recording a real-time file containing real-time data on an information recording medium in such a manner that the real-time data to continuously reproducible by a playback reference model, the real-time data including at least one of video data and audio data, wherein the playback reference model includes a pickup for reading the real-time data from the information recording medium; a buffer memory for temporarily storing the real-time data read by the pickup; and a decoder module for reading the real-time data from the buffer memory for processing, wherein the information recording medium includes a volume space for at least recording in sectors a file including data and file management information for managing the file; wherein the information recording apparatus includes a file system processing section for: allocating at least two areas satisfying a real-time reproduction condition from among a plurality of logically contiguous unused areas within the volume space, each of the at least two areas being designated as a pre-allocated area; recording the real-time data and the file management information; designating a set of logically contiguous sectors in which real-time data is recorded as a real-time extent; and generating the file management information for managing the real-time data as the real-time file, wherein an $(i+1)^{th}$ pre-allocated area among the at least two pre-allocated areas tis positioned at a position satisfying a real-time reproduction condition defined as: $T(i) \leq (B(i-1) + D(i))/Vout$, wherein: $T(i)$ represents a time required for the pickup to access from an end of an $i^{th}$ pre-allocated area among the at least two pre-allocated areas to a beginning of an $(i+1)^{th}$ pre-allocated area among the at least two pre-allocated areas; $B(i)$ represents an amount of data having been stored in the buffer memory when the pickup accesses from the end of the $i^{th}$ pre-allocated area to the beginning of the $(i+1)^{th}$ pre-allocated area, such that $B(i)=B(i-1)+D(i)-Vout \times T(i)$, assuming that $B(0) = 0$, $D(i)$ represents an increase in the amount of data having been stored in the buffer memory responsive to the pickup reading the data from the $i^{th}$ pre-allocated area, such that $D(i)=(Vin-Vout) \times S(i)/Vin$, wherein $D(i)$ is corrected at least to a value equal to or smaller than $M-B(i-1)$ when $D(i)>M-B(i-1)$, where M represents a size of the buffer memory; Vout represents a data transfer rate when the data is transferred from the buffer memory to the decoder module; Vin represents a data transfer rate when the data is read from the pre-allocated area by the pickup and transferred to the buffer memory; and $S(i)$ represents a data size of the $i^{th}$ pre-allocated area.

In one embodiment of the invention, $D(i)$ is corrected so that $D(i)=(Vin-Vout) \times S(i)/Vin+B(i-1) -k \times (Vout \times Tk)$ when $D(i)>M-B(i-1)$, wherein: Tk represents a maximum rotation wait time of the information recording medium; and k represents an integer portion of $((D(i)+B(i-1)-M)/(Vout \times Tk)+1)$.

In another embodiment of the invention, each of the at least one pre-allocated area is allocated in physically contiguous sectors on an ECC block-by-ECC block basis.

In still another embodiment of the invention, the file management information includes location information indicating each real-time extent.

In still another embodiment of the invention, the file management information includes first identification information for identifying the real-time file including real-time data.

In still another embodiment of the invention, the file management information includes second identification information for indicating that the at least two real-time extents are positioned in accordance with the real-time reproduction condition.

In still another embodiment of the invention, the file management information includes, as an extended attribute, information representing a condition under which the at least two real-time extents were positioned.

According to yet another aspect of the present invention, there is provided an information recording apparatus for appending a real-time file containing real-time data on an information recording medium in such a manner that the real-time data is continuously reproducible by a playback reference model, the real-time data including at least one of video data and audio data, wherein the playback reference model includes: a pickup for reading the real-time data from the information recording medium; a buffer memory for temporarily storing the real-time data read by the pickup; and a decoder module for reading the real-time data from the buffer memory for processing, wherein the information recording medium includes a volume space for at least recording in sectors a file including data and file management information for managing the file, the real-time data is recorded in at least one real-time extent each of which is allocated in logically contiguous sectors within the volume space, wherein the information recording apparatus includes: a data amount calculation section for calculating whether or not each of the at least one real-time extent will cause an overflow in an amount of data stored in the buffer memory if the real-time extent is reproduced by the playback reference model; correcting the amount of data stored in the buffer memory to equal to or smaller than the size of the buffer memory when it is calculated that the real-time extent will cause an overflow; calculating whether or not an underflow will occur in the amount of data stored in the buffer memory if the playback reference model accesses from the real-time extent to a newly-allocated pre-allocated area; and searching for a real-time extent which will not cause an underflow, on accessing from the real-time extent to the pre-allocated area when it is calculated that an underflow will occur; a data recording section for recording in the newly allocated pre-allocated area the real-time data already recorded in the real-time extent which will cause an underflow, and recording real-time data to be appended in the newly-allocated pre-allocated area; and a file structure processing section for designating a set of logically contiguous sectors in which real-time data is recorded as a real-time extent and for generating and recording the file management information.

In one embodiment of the invention, each of the at least one pre-allocated area is allocated in physically contiguous sectors on an ECC block-by-ECC block basis.

In another embodiment of the invention, the file management information includes location information indicating each of the at least one real-time extent.

In still another embodiment of the invention, the file management information includes first identification information for identifying the real-time file including real-time data.

In still another embodiment of the invention, the file management information includes second identification information for indicating that the at least two real-time extents are positioned in accordance with the real-time reproduction condition.

In still another embodiment of the invention, the file management information includes, as an extended attribute, information representing a condition under which the at least two real-time extents were positioned.

Alternatively, there is provided an information recording apparatus for appending a real-time file containing real-time data on an information recording medium in such a manner that the real-time data is continuously reproducible by a playback reference model, the real-time data including at least one of video data and audio data, wherein the playback reference model includes: a pickup for reading the real-time data from the information recording medium; a buffer memory for temporarily storing the real-time data read by the pickup; and a decoder module for reading the real-time data from the buffer memory for processing, wherein the information recording medium includes a volume space for at least recording in sectors a file including data and file management information for managing the file, the real-time data is recorded in at least one real-time extent each of which is allocated in logically contiguous sectors within the volume space, wherein the real-time file includes data which is compressed in an MPEG format, wherein the information recording apparatus includes: a re-encoding section for reading data recorded at an end of the real-time file before appending, the data including one or more GOPS, re-encoding the data which has been read, and recording the re-encoded data in a newly allocated pre-allocated area; and a file structure processing section for designating a set of logically contiguous sectors in which real-time data is recorded as a real-time extent and for generating and recording the file management information.

In one embodiment of the invention, each of the at least one pro-allocated area is allocated in physically contiguous sectors on an ECC block-by-ECC block basis.

In another embodiment of the invention, the file management information includes location information indicating each of the at least two real-time extents.

In still another embodiment of the invention, the file management information includes first identification information for identifying the real-time file including real-time data.

In still another embodiment of the invention, the file management information includes second identification information for indicating that the at least two real-time extents are positioned in accordance with the real-time reproduction condition.

In still another embodiment of the invention, the file management information includes, as an extended attribute, information representing a condition under which the at least two real-time extents were positioned.

Alternatively, there is provided an information recording apparatus for recording information on an information recording medium including a volume space for at least recording in sectors a file including data and file management information for managing the file, including: a recording mode determination section for determining whether or not the file is a real-time file containing real-time data; a file structure processing section for recording the file management information in the volume space, a linking setting section for recording the real-time data next to a linking loss extent if the file is determined to be a real-time file; and a linking controller for, responsive to a buffer underrun occurring during the recording of the real-time data, forming a linking gap in a real-time extent in which the real-time data is recorded.

In one embodiment of the invention, the linking loss extent includes one ECC block.

In another embodiment of the invention, the file management information includes location information indicating each real-time extent.

In still another embodiment of the invention, the file management information includes identification information for identifying the real-time file including real-time data.

In still another embodiment of the invention, the linking controller records a data type bit in an area for recording physical additional information concerning each sector within the linking loss extent, the data type bit being used for identifying the linking loss extent; and wherein the data type bit for the sector is set to 1 if a next sector is included within the linking loss extent, unless the sector is a linking sector.

In still another embodiment of the invention, the recording apparatus further includes a runout controller for recording the real-time data in a runout area within the linking loss extent.

According to yet another aspect of the present invention, there is provided a system controller for an information recording apparatus for recording a real-time file containing real-time data on an information recording medium in such a manner that the real-time data is continuously reproducible by a playback reference model, the real-time data including at least one of video data and audio data, wherein the playback reference model includes: a pickup for reading the real-time data from the information recording medium; a buffer memory for temporarily storing the real-time data read by the pickup; and a decoder module for reading the real-time data from the buffer memory for processing, wherein the information recording medium includes a volume space for at least recording in sectors a file including data and file management information for managing the file; wherein the system controller includes a file system processing section for: allocating at least two areas satisfying a real-time reproduction condition from among a plurality of logically contiguous unused areas within the volume space, each of the at least two areas being designated as a pre-allocated area; recording the real-time data and the file management information; designating a set of logically contiguous sectors in which real-time data is recorded as a real-time extent; and generating the file management information for managing the real-time data as the real-time file, wherein an $(i+1)^{th}$ pre-allocated area among the at least two pre-allocated areas is positioned at a position satisfying a real-time reproduction condition defined as: $T(i) \leq (B(i-1)+D(i))/Vout$, wherein: $T(i)$ represents a time required for the pickup to access from an end of an pre-allocated area among the at least two pre-allocated areas to a beginning of an $(i+1)^{th}$ pre-allocated area among the at least two pre-allocated areas; $B(i)$ represents an amount of data having been stored in the buffer memory when the pickup accesses from the end of the $i^{th}$ pre-allocated area to the beginning of the $(i+1)^{th}$ pre-allocated area, such that $B(i)=B(i-1)+D(i)-Vout \times T(i)$, assuming that $B(0)=0$, $D(i)$ represents an increase in the amount of data having been stored in the buffer memory responsive to the pickup reading the data from the $i^{th}$ pre-allocated area, such that $D(i) (Vin-Vout) \times S(i)/Vin$, wherein $D(i)$ is corrected at least to a value equal to or smaller than $M-B(i-1)$ when $D(i) >M-B(i-1)$, where M represents a size of the buffer memory; Vout represents a data transfer rate when the data is transferred from the buffer memory to the decoder module; Vin represents a data transfer rate when the data is read from the at pre-allocated are by the pickup and transferred to the buffer memory: and $S(i)$ represents a data size of the $i^{th}$ pre-allocated area.

Alternatively, there to provided a system controller for an information recording apparatus for appending a real-time file containing real-time data on an information recording medium in such a manner that the real-time data is continuously reproducible by a playback reference model, the real-time data including at least one of video data and audio data, wherein the playback reference model includes: a pickup for reading the real-time data from the information recording medium, a buffer memory for temporarily storing the real-time data read by the pickup; and a decoder module for reading the real-time data from the buffer memory for processing, wherein the information recording medium includes a volume space for at least recording in sectors a file including data and file management information for managing the file, the real-time data is recorded in at least one real-time extent each of which is allocated in logically contiguous sectors within the volume space, wherein the system controller includes: a data amount calculation section for calculating whether or not each of the at least one real-time extent will cause an overflow in an amount of data stored in the buffer memory if the real-time extent is reproduced by the playback reference model; correcting the amount of data stored in the buffer memory to equal to or smaller than the size of the buffer memory when it is calculated that the real-time extent will cause an overflow; calculating whether or not an underflow will occur in the amount of data stored in the buffer memory if the playback reference model accesses from the real-time extent to a newly-allocated pre-allocated area; and searching for a real-time extent which will not cause an underflow, on accessing from the real-time extent to the pre-allocated area when it is calculated that an underflow will occur; a data recording section for recording in the newly allocated pre-allocated area the real-time data already recorded in the real-time extent which will cause an underflow, and recording real-time data to be appended in the newly-allocated pre-allocated area; and a file structure processing section for designating a set of logically contiguous sectors in which real-time data is recorded as a real-time extent and for generating and recording the file management information.

According to yet another aspect of the present invention, there is provided a method for reproducing a real-time file containing real-time data on an information recording medium in such a manner that the real-time data is continuously reproducible by a playback reference model, the real-time data including at least one of video data and audio data, wherein the playback reference model includes: a pickup for reading the real-time data from the information recording medium; a buffer memory for temporarily storing the real-time data read by the pickup; and a decoder module for reading the real-time data from the buffer memory for processing, wherein the information recording medium includes a volume space for at least recording in sectors a file including data and file management information for managing the file, wherein the real-time data in recorded in at least two real-time extents each of which is allocated in logically contiguous sectors within the volume space; and an $(i+1)^{th}$ real-time extent among the at least two real-time extents is positioned at a position satisfying a real-time reproduction condition defined as: $T(i) \leq (B(i-1)+D(i))/Vout$, wherein: $T(i)$ represents a time required for the pickup to access from an end of an its real-time extent among the at least two real-time extents to a beginning of the $(i+1)^{th}$ real-time extent; $B(i)$ represents an amount of data having been stored in the buffer memory when the pickup accesses from the end of the $i^{th}$ real-time extent to the beginning of the $(i+1)$=real-time extent, such that $B(i)=B(i-1)+D(i)-Vout \times T(i)$, assuming that $B(0)=0$, $D(i)$ represents an increase in the amount of data having been stored in the buffer memory responsive to the pickup reading the data from the $i^{th}$ real-time extent, such that $D(i)=(Vin-Vout) \times S(i)/Vin$, wherein $D(i)$ in corrected at least to a value equal to or smaller than $M-B(i-1)$ when $D(i)>M-B(i-1)$, where D represents a size of the buffer memory; Vout represents a data transfer rate when the data is transferred from the buffer memory to the S decoder module; Vin represents a data transfer rate when the data is read from each of the at least two real-time extents by the pickup and transferred to the buffer memory; and $S(i)$ represents a data size of the $i^{th}$ real-time extent, wherein the method includes the steps of: reproducing the real-time file from the information recording medium by means of a disk drive; acquiring location information of each of the at least two real-time extents and identification information indicating that the at least two real-time extents are positioned in accordance with the real-time reproduction condition; reading data from the at least two real-time extents at a data transfer rate which is equal to or greater than Vin of the playback reference model; temporarily storing the real-time data which has been read in the buffer memory; reading the data stored in the buffer memory and decoding the data in a decoder; and accessing a next real-time extent within the time $T(i)$ of the playback reference model.

In one embodiment of the invention, the file management information includes, as an extended attribute, information representing a condition under which the at least two real-time extents were positioned, the method further including a step oft reading the extended attribute from the file management information, and informing a reproduction mode to the disk drive based on the extended attribute prior to reproduction.

Alternatively, there is provided a method for reproducing real-time data from an information recording medium including a volume space for at least recording in sectors a file including data and file management information for managing the file, wherein: the data includes real-time data, the real-time data including at least one of video data and audio data; the real-time data is recorded in at least one real-time extent each of which is allocated in logically contiguous sectors within the volume space; the file includes at least one real-time extent; a linking loss extent is positioned before each of the at least one real-time extent; and a linking gap is formed in the at least one real-time extent, wherein the method includes the steps of: determining whether or not the file is a real-time file containing real-time data; and performing a reproduction operation for data recorded in a real-time extent, the reproduction operation being continuously performed without performing a recovery process even If a reproduction error due to invalid data recorded in the linking gap occurs.

According to yet another aspect of the present invention, there is provided an information reproduction apparatus for reproducing a real-time file containing real-time data on an information recording medium in such a manner that the real-time data is continuously reproducible by a playback reference model, the real-time data including at least one of video data and audio data, wherein the playback reference model includes: a pickup for reading the real-time data from the information recording medium; a buffer memory for temporarily storing the real-time data read by the pickup; and a decoder module for reading the real-time data from the buffer memory for processing, wherein the information recording medium includes a volume space for at least recording in sectors a file including data and file management information for managing the file, wherein the real-time data is recorded in at least two real-time extents each of which is allocated in logically contiguous sectors within the volume space; and an $(i+1)^{th}$ real-time extent among the at least two real-time extents is positioned at a position satisfying a real-time reproduction condition defined as: $T(i) \leq (B(i-1)+D(i))/Vout$, wherein: $T(i)$ represents a time required for the pickup to access from an end of an $i^{th}$ real-time extent among the at least two real-time extents to a beginning of the $(i+1)^{th}$ real-time extent: $B(i)$ represents an amount of data having been stored in the buffer memory when the pickup accesses from the end of the $i^{th}$ real-time extent to the beginning of the $(i+1)^{th}$ real-time extent, such that $B(i)=B(i-1)+D(i)=Vout \times T(i)$, assuming that $B(0)=0$, $D(i)$ represents an increase in the amount of data having been stored in the buffer memory responsive to the pickup reading the data from the $i^{th}$ real-time extent, such that $D(i)$ $(Vin-Vout) \times S(i)/Vin$, wherein $D(i)$ is corrected at least to a value equal to or smaller than $M-B(i-1)$ when $D(i)>M-B(i-1)$, where M represents a size of the buffer memory; Vout represents a data transfer rate when the data 18 transferred from the buffer memory to the decoder module; Vin represents a data transfer rate when the data is read from each of the at least two real-time extents by the pickup and transferred to the buffer memory; and $S(i)$ represents a data size of the $i^{th}$ real-time extent, wherein the information reproduction apparatus includes: a disk drive for reproducing the real-time file from the information recording medium; a file structure processing section for acquiring location information of each of the at least two real-time extents and identification information indicating that the at least two real-time extents are positioned in accordance with the real-time reproduction condition; a data reproducer far reading data from the at least two real-time extents at a data transfer rate which is equal to or greater than Vin of the playback reference model; a buffer memory for temporarily storing the real-time data which has been read; and a decoder for reading the data stored in the buffer memory and decoding the data, wherein a data reproduction performance which to determined as a function of an access performance and data transfer rate of the data reproducer and a size of the buffer memory satisfies a predetermined data reproduction performance of the playback reference model.

In one embodiment of the invention, the file management information includes, as an extended attribute, information representing a condition under which the at least two real-time extents were positioned, the information reproduction apparatus further including: a reproduction mode informing section for reading the extended attribute from the file management information, and informing a reproduction mode to the disk drive based on the extended attribute prior to reproduction.

Alternatively, there is provided an information reproduction apparatus for reproducing a real-time file containing real-time data on an information recording medium including a volume space for at least recording in sectors a file including data and file management information for managing the file, wherein: the data includes real-time data, the real-time data including at least one of video data and audio data; the real-time data is recorded in at least one real-time extent each of which is allocated in logically contiguous sectors within the volume space; the file includes at least one real-time extent; a linking loss extent is positioned before each of the at least one real-time extent; and a linking gap is formed in the at least one real-time extent, wherein the information reproduction apparatus includes: a file structure processing section for determining whether or not the file is a real-time file containing real-time data; and a data reproducer for performing a reproduction operation for data recorded in a real-time extent, the reproduction operation being continuously performed without performing a recovery process even if a reproduction error due to invalid data recorded in the inking gap occurs.

The information recording medium according to the present invention, on which real-time extents are positioned so as to satisfy a real-time reproduction condition, utilizes a playback reference model so as to enable reproduction apparatuses to continuously reproduce real-time data. As a result, various reproduction apparatuses can continuously reproduce real-time data from the information recording medium according to the present invention.

Since each real-time extent is composed of a physically contiguous area, it to possible to calculate underflows occurring responsive to accesses.

By providing an area for recording information for identifying real-time files from general files in a file management information area, it is possible to more effectively perform continuous reproduction even when errors occur during the reproduction of a real-time file.

By providing information indicating that a real-time reproduction condition is satisfied by the real-time extents in the file management information area, it is possible to determine whether or not a reproduction apparatus satisfying the prescribed performance of the playback reference model can continuously reproduce a real-time file from the information recording medium according to the present invention.

Even in the case where real-time data is appended to a previously recorded real-time file, it is possible to position or arrange real-time extents on the information recording medium according to the present invention based on the real-time reproduction condition, so that a reproduction apparatus can continuously reproduce data from the beginning of the appended real-time file.

Even in the case where the appended data is real-time data which has been encoded in the MPEG format, it is ensured that a reproduction apparatus can continuously reproduce data by providing an area for recording re-encoded VOBUs in a newly allocated unrecorded area.

In accordance with the information recording medium according to the present invention, even in the case where it is implemented as an optical disk which records data by using a linking scheme, e.g., a DVD-R disk, it is ensured that real-time data is recorded in contiguous areas even if a buffer underrun occurs while a recording apparatus records real-time data, by providing a real-time extent after a linking loss extent and forming a linking gap within the real-time extent. By providing a real-time extent after a linking loss extent, it is possible to improve data reliability in the beginning portion of the real-time data.

By sizing each linking loss extent as one ECC block, it to possible to further improve data reliability in the beginning portion of real-time data.

By providing an area for recording information for identifying a linking loss extent in an area for recording physical additional information, a reproduction apparatus can recognize, upon detection of a linking gap, that the sector contains unnecessary data, thereby simplifying the designing of reproduction apparatuses.

By recording valid data in a runout area, it is ensured that the only areas in which data cannot be recorded will be the linking gaps even if a buffer underrun occurs when a recording apparatus records real-time data, so that the reliability of real-time data can be improved.

The recording method according to the present invention is capable of searching for and allocating real-time extents in such a manner as to realize continuous reproduction of real-time data, by calculating a data amount within a buffer memory during reproduction.

In accordance with the recording method according to the present invention, areas in which the playback reference model will not experience overflow or underflow can be calculated before recording of real-time data. As a result, it is possible to record data in such a manner that various reproduction apparatuses can continuously reproduce real-time data.

Even in the case where new real-time data is appended to an already-recorded real-time file, upon detecting that the playback reference model will experience a buffer underflow, the real-time data recorded in an area which is considered responsible for the buffer underflow can be copied to an unrecorded area, whereby data can be recorded in such a manner that a reproduction apparatus can continuously reproduce the real-time data.

In the case where appended data is real-time data which has been encoded in the MPEG format, the last VOBU in already-recorded AV data can be re-encoded along with the newly appended data for recording, thereby making it possible to attain seamless reproduction of MPEG streams.

The recording method according to the present invention provides an appropriate method of recording data on an optical disk which utilizes a linking scheme for data recording. For example, since information relating to an I picture is recorded in the first sector of MPEG data, the data quality of the first sector is very influential over the reproduced images and sounds. In the case of high-quality audio data, too, the data quality of the first sector will determine the impression of a song at its beginning. Therefore, in the case of recording real-time data, every first sector is required to have a high reliability.

On the other hand, audio/video data which is recorded in extents require continuous recording and continuous reproduction capabilities because "freezing" of images and sounds, occurring responsive to an access, will be more readily recognized than a deterioration in the quality of images and/or sounds due to loss of data.

In accordance with the recording method according to the present invention, the first sector can be recorded so as to succeed a linking loss extent, so that linking sectors will not be formed, thereby contributing to high data reliability. Since a linking loss extent is not formed responsive to every instance of buffer underrun, it is possible to continuously record real-time data.

Any data that was not successfully recorded due to a linking gap can be easily error-corrected based on ECCs, because each linking gap is only several bytes in size.

Even if a buffer underrun occurs during recording, it is ensured that a multitude of linking loss areas will not be formed, thereby providing for a high recording efficiency. Furthermore, it is possible to reduce the size of address information pertaining to each real-time extent, which is managed by a file system.

In accordance with the reproduction method according to the present invention, it is possible to switch between a read command for general data and a read command for real-time data, based on file type information, so that it to possible to realize continuous reproduction even if a defective sector is detected during the reading of real-time data.

The data reproduction performance of the information reproduction apparatus according to the present invention, which is determined as a function of the access performance and data read performance of a reproduction drive and the size of a reproduction buffer memory, is selected so as to satisfy a predetermined data reproduction performance that is defined by the playback reference model. As a result, continuous reproduction capabilities are provided on any information reproduction apparatuses that share the same data reproduction performance.

Thus, the invention described herein makes possible the advantages of (1) providing an information recording medium in the form of a recordable optical disk which enables continuous reproduction of real-time data; (2) providing a method for recording data on ouch an information recording medium and a method for reproducing data on such an information recording medium; and (3) providing an information recording apparatus and an information reproduction apparatus to be used in conjunction with such an information recording medium.

These and other advantages of the present invention will become apparent to those skilled in the art upon reading and understanding the following detailed description with reference to the accompanying figures.

BRIEF DESCRIPTION OF THE DRAWINGS

FIGS. 7A, 7B, and 7C are data structural diagrams illustrating the data structure of attribute information of a real-time file according to Example 1 of the present invention.

FIG. 8 is a flowchart illustrating a reproduction method according to Example 1 of the present invention.

DESCRIPTION OF THE PREFERRED EMBODIMENTS

Hereinafter, the present invention will be described by way of illustrative examples, with reference to the accompanying figures.

Example 1 is directed to an embodiment in which a real-time file is newly recorded on a DVD-RAM disk. Example 2 is directed to an embodiment in which real-time data is appended to a real-time file which has already been recorded on a DVD-R disk.

(Example 1)

Figure 1:
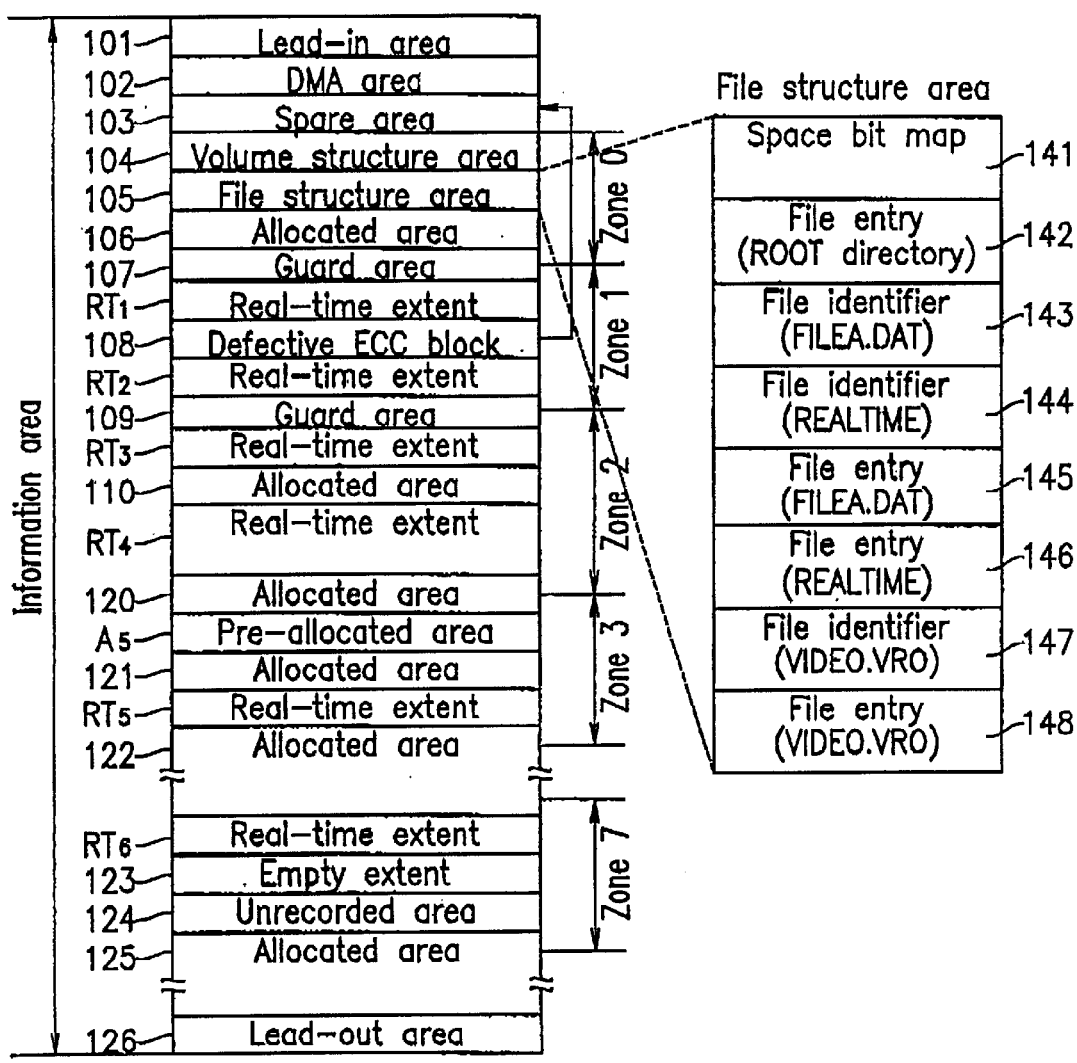
FIG. 1 is a data structural diagram illustrating area structures on an information recording medium according to Example 1 of the present invention.
Figure 2A:
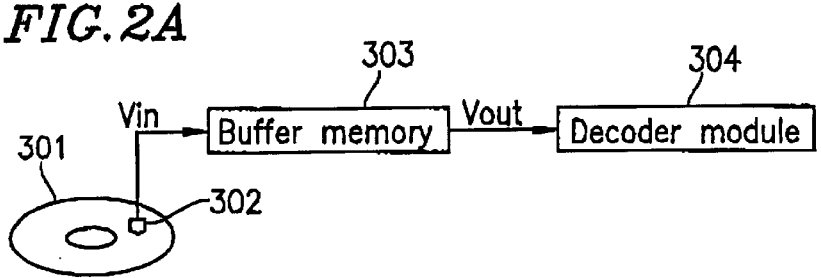
FIGS. 2A and 2D illustrate the structure of a playback reference model and its access performance, respectively, according to Example 1 of the present invention.

In the course of our description, the area structures in an information recording medium in which files that are managed based on a volume file structure an specified under the ECMA167 Standards (shown in FIG. 1) and a playback reference model and access performance illustrated in FIG. 2A and 2D will be first described. Then, a method for recording a real-time file on the information recording medium shown in FIG. 1 will be described with reference to a block structural diagram shown in FIG. 3 and a flowchart shown in FIG. 4. Finally, a method for reproducing a real-time file on the information recording medium shown in FIG. 1 will be described with reference to the block structural diagram shown in FIG. 3 and a flowchart shown in FIG. 8.

In the following description, it is assumed that various descriptors, pointers, and the like which are recorded in the volume/file structures of an information recording medium conform to the data structures defined under the ECMA167 Standards, unless otherwise specified.

FIG. 1 is a data structural diagram illustrating the area structures on an information recording medium in the form of a rewritable optical disk according to one embodiment of the present invention. As shown in FIG. 1, information areas, which are composed of physical sectors, include a lead-in area 101, a DMA area 102, zones 0 to 34 (not all of which are shown), and a lead-out area 126. In the beginning portion of zone 0, a spare area 103 for substituting for a defective sector or a defective block is provided, followed by a volume space. From the beginning of the volume apace, a volume structure area 104 for logically handling the information recording medium, and a file structure area 105 in which a file structure is recorded, are provided.

Allocated areas 106, 110, 120, 121, 122, and 125 are regions in which data have already been recorded. Guard areas 107 and 109, in which no user data can be recorded, are formed between zone 0 and zone 1, and between zone 1 and zone 2, respectively. Although not shown, allocated areas 120, 122, and 125 include guard areas formed at respective zone boundaries. In zone 1, real-time extents $RT_1$ and $RT_2$, in which real-time data is recorded, are formed so as to interpose a defective block 108 in between, for example. The defective block 108 may be a defective block which has been detected during the recording of general data, whose data is recorded in the spare area 103 as a substitution. In zone 2, real-time extents $RT_3$ and $RT_4$ are formed. In zone 3, a pre-allocated area $A_5$ and a real-time extent $R_5$ are formed.

Figure 17:
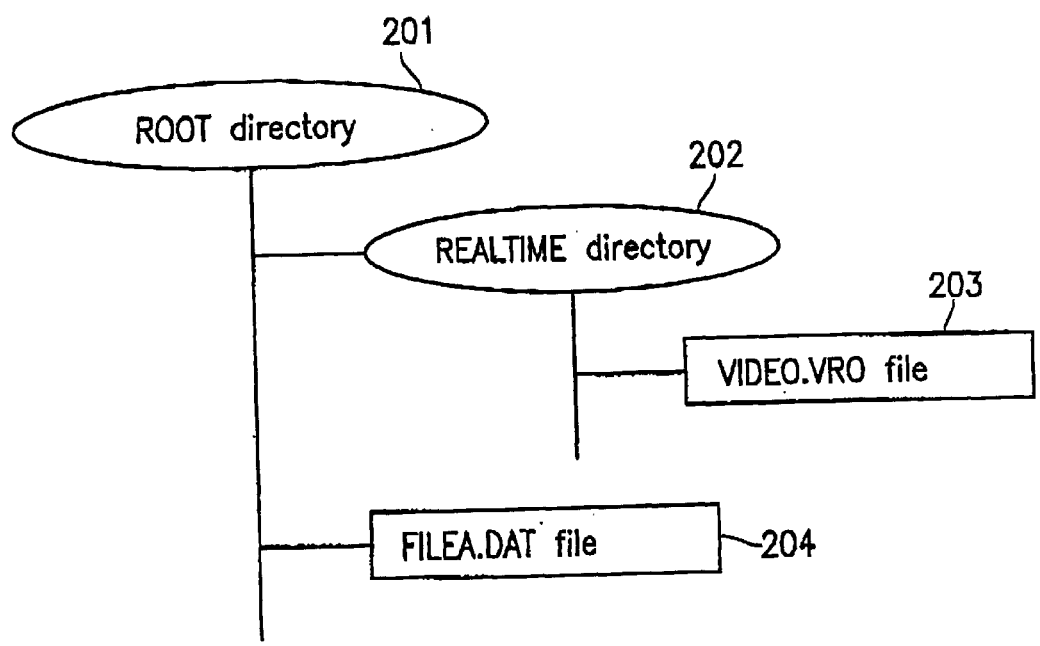
FIG. 17 is schematic representation of a directory structure for files to be recorded.
Figure 18A:
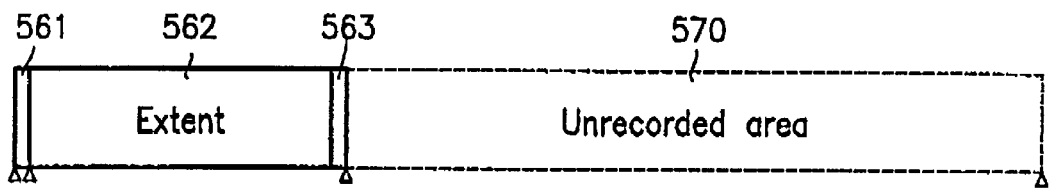
FIGS. 18A to 18C are data diagrams illustrating an extent arrangement in the case where AV data is appended to a VIDEO.VRO file.
Figure 18B:
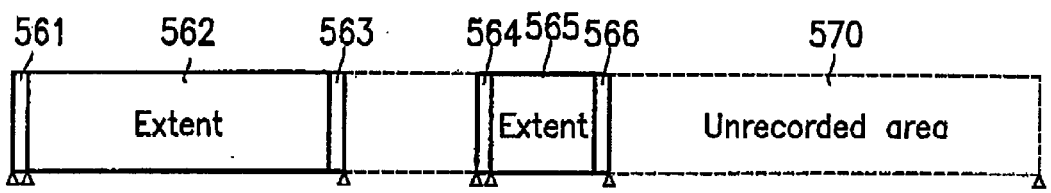
Figure 18C:
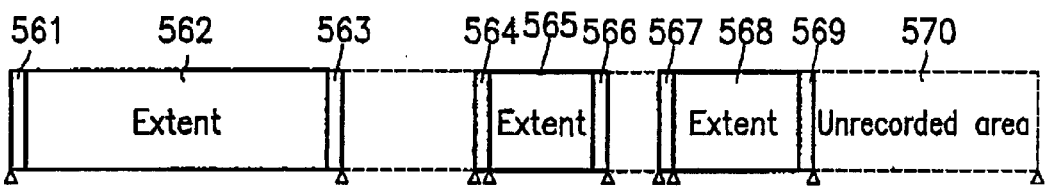
Figure 19A:
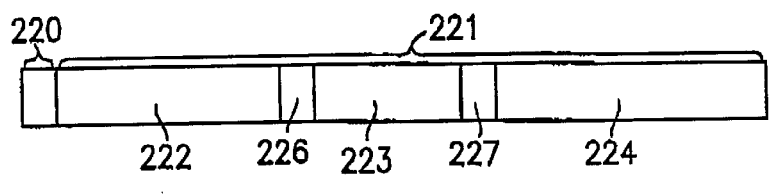
FIGS. 19A to 19D are data structural diagrams illustrating a linking scheme for a DVD-R disk.
Figure 19B:
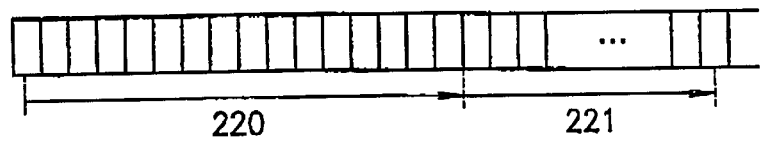
Figure 19C:
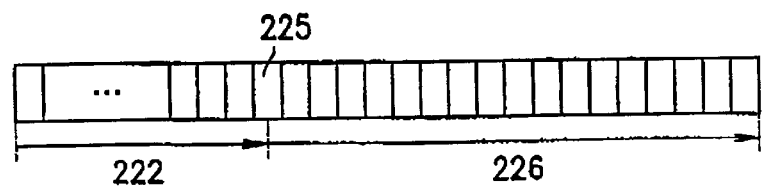
Figure 19D:
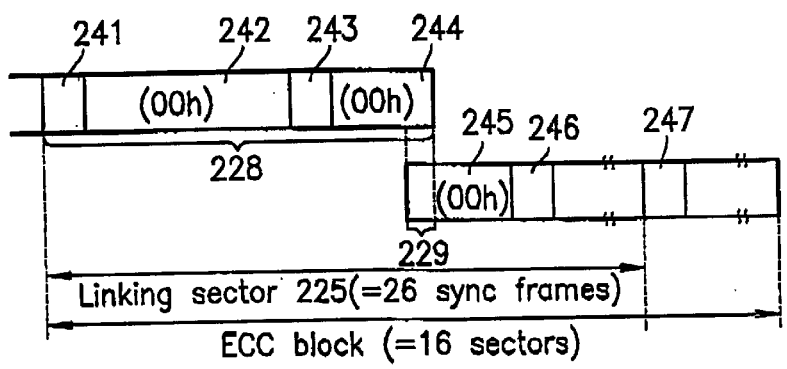

In zone 7, a real-time extent $RT_6$, an empty extent 123, and an unused area 124 are formed. The real-time extents $RT_1$ to $RT_6$ are positioned in such a manner as to satisfy a set of conditions which are defined by a playback reference model having a predetermined access performance, as described later in more detail. No real-time data is recorded in the pre-allocated area $A_5$ because any real-time data recorded in this area would result in an interruption of continuous data reproduction. In the file structure area 105, a space bit map 141 for managing unallocated areas (which are capable of allowing data to be recorded therein) within the volume space and file management information having a directory structure as shown in FIG. 17 are recorded.

A file entry 142 is management information for managing the location information and attribute information of the ROOT directory 201. The ROOT directory file includes file identifier descriptors 143 and 144. The file identifier descriptors 143 and 144 contain location information of file entries 145 (FILEA.DAT file 204 under the ROOT directory 201) and 146 (the REALTIME directory 202 under the ROOT directory 201), respectively. The file entry 145 includes location information of the allocated area 106 in which the data of this file is recorded. The file entry 146 includes location information of a REALTIME directory file, i.e., the file identifier descriptor 147. A file identifier descriptor 147 includes location information of a file entry 148 for the VIDEO.VRO file 203. The file entry 148 includes location information of real-time extents $RT_1$ to $RT_6$, in which real-time data it recorded, and the empty extent 123.

Figure 2B:
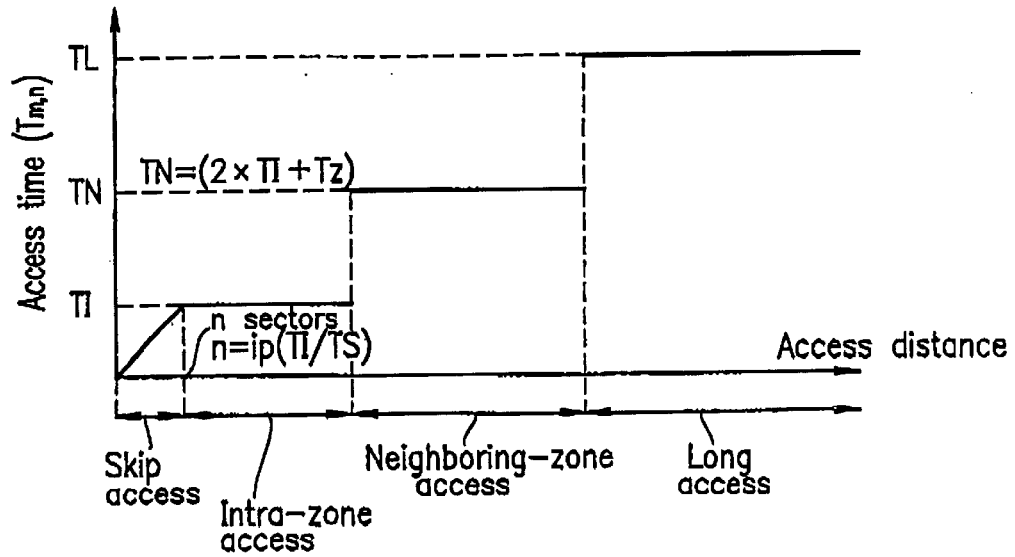

FIGS. 2A and 2B illustrate a playback reference model and its access performance for determining conditions for positioning the real-time data according to one embodiment of the present invention, respectively. The playback reference model shown in FIG. 2A includes a disk 301, a pickup 302 for reading data from the disk 301, a buffer memory 303 for temporarily storing the data that has been read, and a decoder module 304 for decoding the data which has been transferred from the buffer memory 303. Vin denotes a data transfer rate when transferring data from the disk 301 to the buffer memory 303. Vout denotes a data transfer rate when transferring data from the buffer memory 303 to the decoder module 304. Vin is set at a value which is larger than Vout, which defines the largest data transfer rate for any real-time data that is contemplated for each given application.

FIG. 2B is a graph illustrating a relationship between access distances and access times during an access made by the pickup 302 in the playback reference model. In FIG. 2B, ip(x) is a function which extracts an integer portion of x. Assuming that n=ip (TI/TS), any access to an nth sector takes a skip access time, which is an integer function of an n multiple of single sector latencies TS. For any access that occurs astride a zone boundary, a fixed time TZ ("zone boundary crossing time") applies. For any access to a position within the same zone, a fixed time TI ("intra-zone access time") applies. For any access to a position in a neighboring zone, TN ("neighboring zone access time")=

(2TI+TZ) applies. For any access to a position which is two or more zones away, a fixed time TL ("long access time") applies, which in substantially equal to a full stroke access time required for the pickup 302 to travel from the innermost periphery to the outermost periphery.

This playback reference model is created so as to serve as a reference in determining conditions under which continuous reproduction is ensured when reproducing real-time data on an optical disk is reproduced by any one of various types of reproduction apparatuses. Accordingly, each access time in the access performance profile defined in the graph of FIG. 2B are to be determined on the basis of access times which are realizable on various reproduction apparatus which are envisaged to reproduce the optical disk according to the present invention. For example, a portable optical disk player for consumer use, which is required to operate under certain power consumption conditions, incurs longer access times than does an optical disk drive for use with a computer. Under such circumstances, the access performance profile defined in the graph of FIG. 2B are to be determined on the basis of the access times incurred by the portable optical disk player for consumer use.

When reading data in accordance with the playback reference model, data will be stored in the buffer memory 303 at a rate of Vin−Vout; on the other hand, during an access operation of the pickup 302, data within the buffer memory 303 will be consumed at a rate of Vout because data cannot be read. By applying specific access time values in this operation model, it is possible to quantitatively calculate variations in the data amount within the buffer memory 303 an the playback reference model reproduces real-time data. Accordingly, if data recording areas are positioned in such a manner that the data within the buffer memory 303 does not experience underflowing as the playback reference model reproduces real-time data, then it is possible to continuously reproduce real-time data. By means of this modeling, conditions for positioning the real-time extents (in which real-time data is recorded) can be determined.

Figure 3:
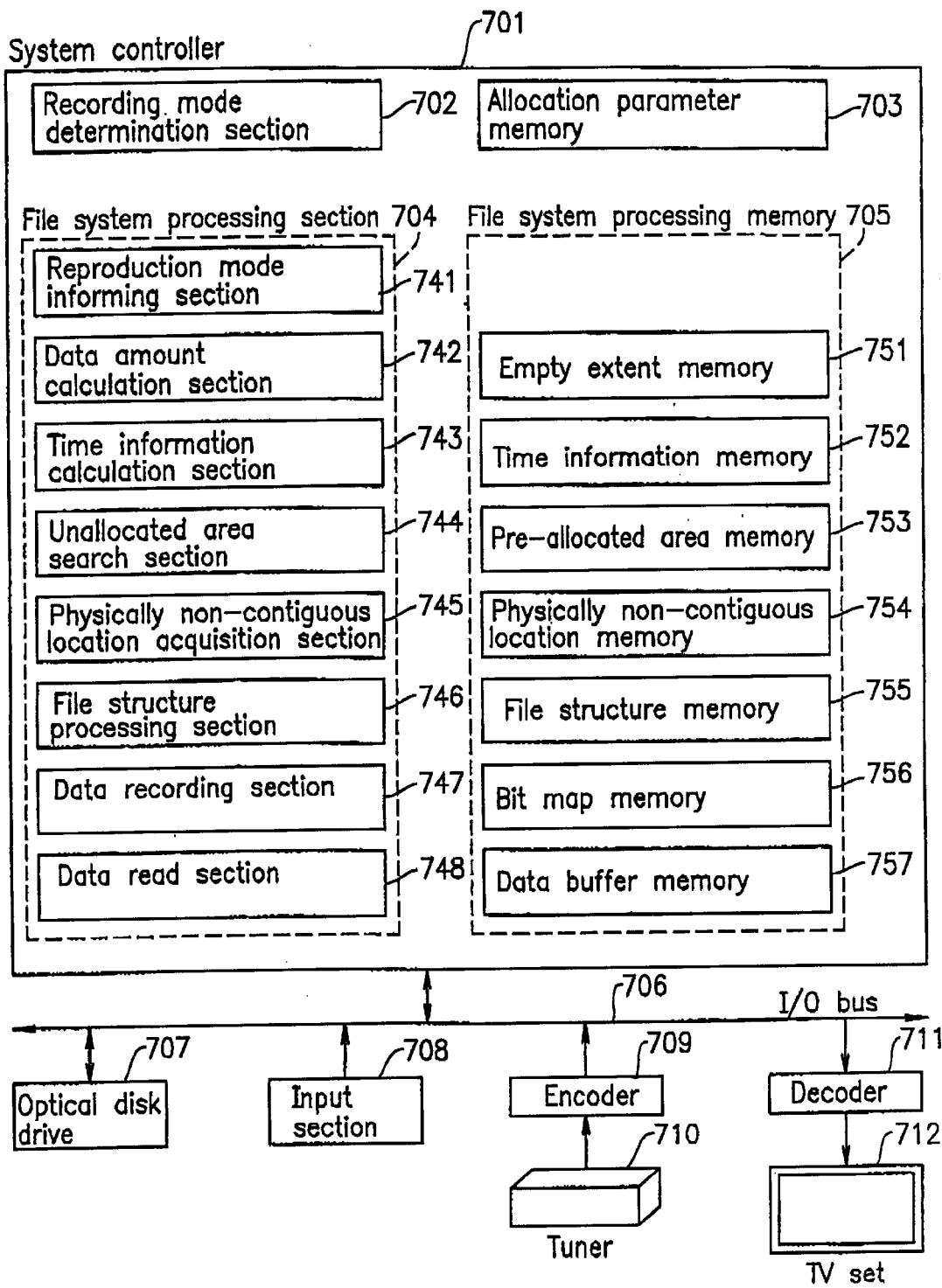
FIG. 3 is a block diagram of the information recording/reproduction apparatus according to Example 1 of the present invention.
Figure 4:
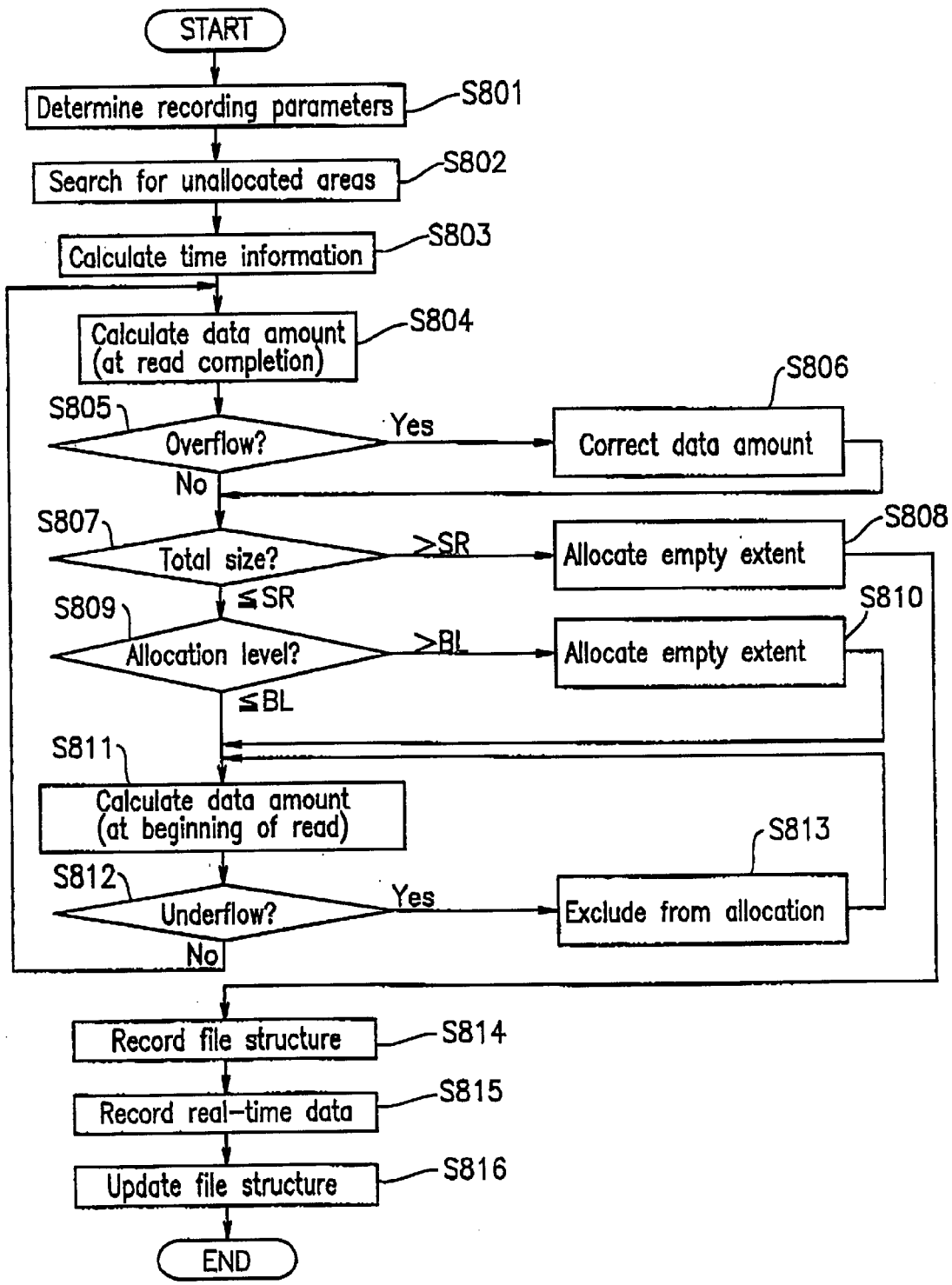
FIG. 4 is a flowchart illustrating a recording method according to Example 1 of the present invention.

Now, with reference to a block diagram shown in FIG. 3 and a flowchart shown in FIG. 4 of an information recording/reproduction apparatus according to one embodiment of the present invention, a method for recording real-time files to the information recording medium shown in FIG. 1 will be described. The information recording/reproduction apparatus includes a system controller 701, an I/O bus 706, an optical disk drive 707, an input section 708 for inputting recording modes, etc., a tuner 710 for receiving TV broadcast programs, an encoder 709 for encoding video/audio signals into AV data, and a decoder 711 for decoding the AV data and outputting the decoded AV data to a TV set 712. The system controller 701 includes: a recording mode determination section 702, an allocation parameter memory 703, a file system processing section 704, and a file system processing memory 705. The file system processing section 704 includes: a reproduction mode informing section 741, a data amount calculation section 742, a time information calculation section 743, an unallocated area search section 744, a physically non-contiguous location acquisition section 745, a file structure processing section 746, a data recording section 747, and a data read section 748. The file system processing memory 705, which is utilized by these sections includes: an empty extent memory 751, a time information memory 752, a pre-allocated area memory 753, a physically non-contiguous location memory 754, a file structure memory 755, a bit map memory 756, a data buffer memory 757.

It is ensured that the access performance and the recording rate during data recording of the optical disk drive 707 and the size of the data buffer memory 757 are chosen so as to provide a data recording performance which satisfies a level of recording performance that would be attained by using the playback reference model for recording.

A recording made and a recording time are designated via the input section 708, which may be implemented as a remote control, a mouse, or a keyboard. The recording mode determination section 702 first determines whether the data to be recorded is AV data or not, and performs the subsequent steps if the data to be recorded is AV data. If the data to be recorded is AV data, the recording mode determination section 702 determines Vout, which defines a fixed value which is used to ensure successful recording even in the case where any data to be recorded is continually provided at the maximum data transfer rate; Vin, which defines a read rate from the disks size SR of data to be recorded; a buffer size Bmax; and various access times, and store these values in the allocation parameter memory 703. As for real-time data which is recorded on a DVD-RAM disk, predetermined fixed values for read rate Vin and buffer size Bmax are already retained in the allocation parameter memory 703 in order to clarify the requirements that an apparatus must satisfy in order to be able to reproduce that particular real-time. More than one set of such fixed values are preset so as to support read drives which may be relatively faster or slower. The read rate Vin depends on the data to be recorded, and the maximum data transfer rate for given data that is desired to be recorded by a user may be designated for Vin. For example, a relatively large value is set for the read rate Vin in the case of recording in high picture quality mode, and a relatively small value is set for the read rate Vin in the case of recording in a long-time mode (Step S801).

The file structure processing section 746 instructs the data read section 748 to read the volume structure area 104 and the file structure area 105, and the data which has been read by the optical disk drive 707 is analyzed on the file structure memory 755. A space bit map which to among the data that has been read is transferred to the bit map memory 756. The physically non-contiguous location acquisition section 745 instructs the optical disk drive 707 to report location information of zone boundaries and/or location information of defective blocks registered in the PDL or SDL, as physically non-contiguous location information on the disk. The physically non-contiguous location information which has been reported from the optical disk drive 707 is retained in the physically non-contiguous location memory 754.

The unallocated area search section 744 searches for any unallocated areas which are physically contiguous on an ECC block-by-ECC block basis as pre-allocated areas, by using the location information of unallocated areas retained in the bit map memory 756 and the physically non-contiguous location information retained in the physically non-contiguous location memory 754. The location information of the pre-allocated areas found in the search is stored in the pre-allocated area memory 753. This search operation is performed until the total size of the pre-allocated areas well exceeds the size of data to be recorded SR as determined at Step S801, so that it will be unnecessary to again perform this step even if any areas which cannot be allocated are found in later steps.

Figure 5A:
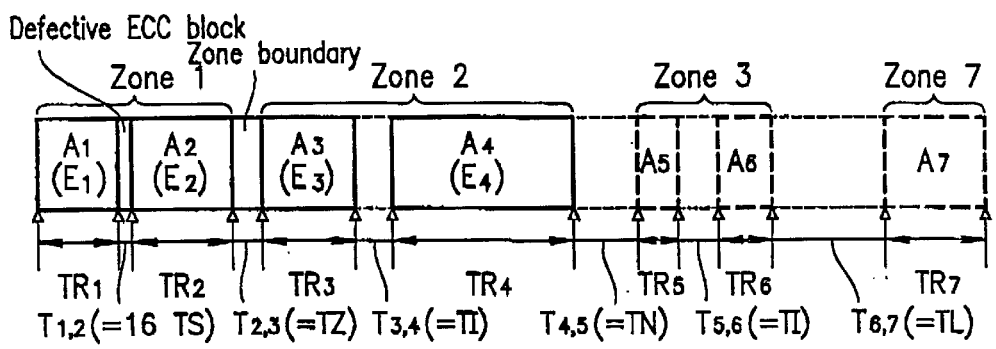
FIGS. 5A to 5C are diagrams illustrating an exemplary area arrangement allocated for a real-time file in accordance with the recording method according to Example 1 of the present invention.

FIG. 5A is a diagram illustrating an exemplary arrangement of locations of pre-allocated areas which have been found as a result of the search in this step. Pre-allocated areas $A_1$ to $A_7$ are allocated. In order to secure the pre-allocated areas, the file structure processing section 746 updates corresponding pre-allocated regions in the bit map on the bit map memory 756 to an "allocated" status.

At this point, all areas that are found to be recordable based on the space bit map, except for those registered in the SDL, are logically-contiguous recordable areas because any area that is registered in the SDL would actually be recorded in the spare area as a substitution. Moreover, logically-contiguous areas can be determined by splitting such logically-contiguous areas at the guard areas within each zone or at the boundaries between the areas registered in the PDL. The reason for searching for physically-contiguous areas is so that the transition in the amount of data within the buffer can be more accurately calculated in the subsequent steps.

The reason why the search is performed on an ECC block-by-ECC block basis is in order to prevent real-time data from being subjected to a replacement process, as part of defect management, in the case where both real-time data and general data are recorded in one ECC block (Step S802).

The time information calculation section 743 calculates a read time $TR_i$ (where i corresponds to the area number $A_1$ for pre-allocated areas as shown in FIG. 5A) required for reading each pre-allocated area at a data transfer rate of Vin and an access time $T_{i,i+1}$ between pre-allocated areas (i.e., access time between pre-allocated areas $A_i$ and $A_{i+1}$ as shown in FIG. 5A), by using the location information of pre-allocated areas retained in the pre-allocated area memory 753 and the various access times retained in the allocation parameter memory 703. The read time $TR_i$ is determined to be $S_i$/Vin, where $S_i$ represents the size of each pre-allocated area $A_i$.

In FIG. 5A, the read times $TR_1$ to $TR_7$ are times required for reading the pre-allocated areas $A_1$ to $A_7$, respectively. The access time $T_{1,2}$ is a read delay time which is ascribable to a defective ECC block, equal to 16TS. $T_{2,3}$, $T_{3,4}$, $T_{4,5}$, $T_{5,6}$, and $T_{6,7}$, are a zone boundary crossing time TZ, an intra-zone access time TI, a neighboring zone access time TN, an intra-zone access time TI, and a long access time TL, respectively. These access times can be derived from the access performance of the playback reference model as shown in FIG. 2B. In order to calculate how the playback reference model would reproduce data from pre-allocated areas, the read time for each pre-allocated area and the access time for a next pre-allocated area are alternately calculated (Step S803).

Figure 6:
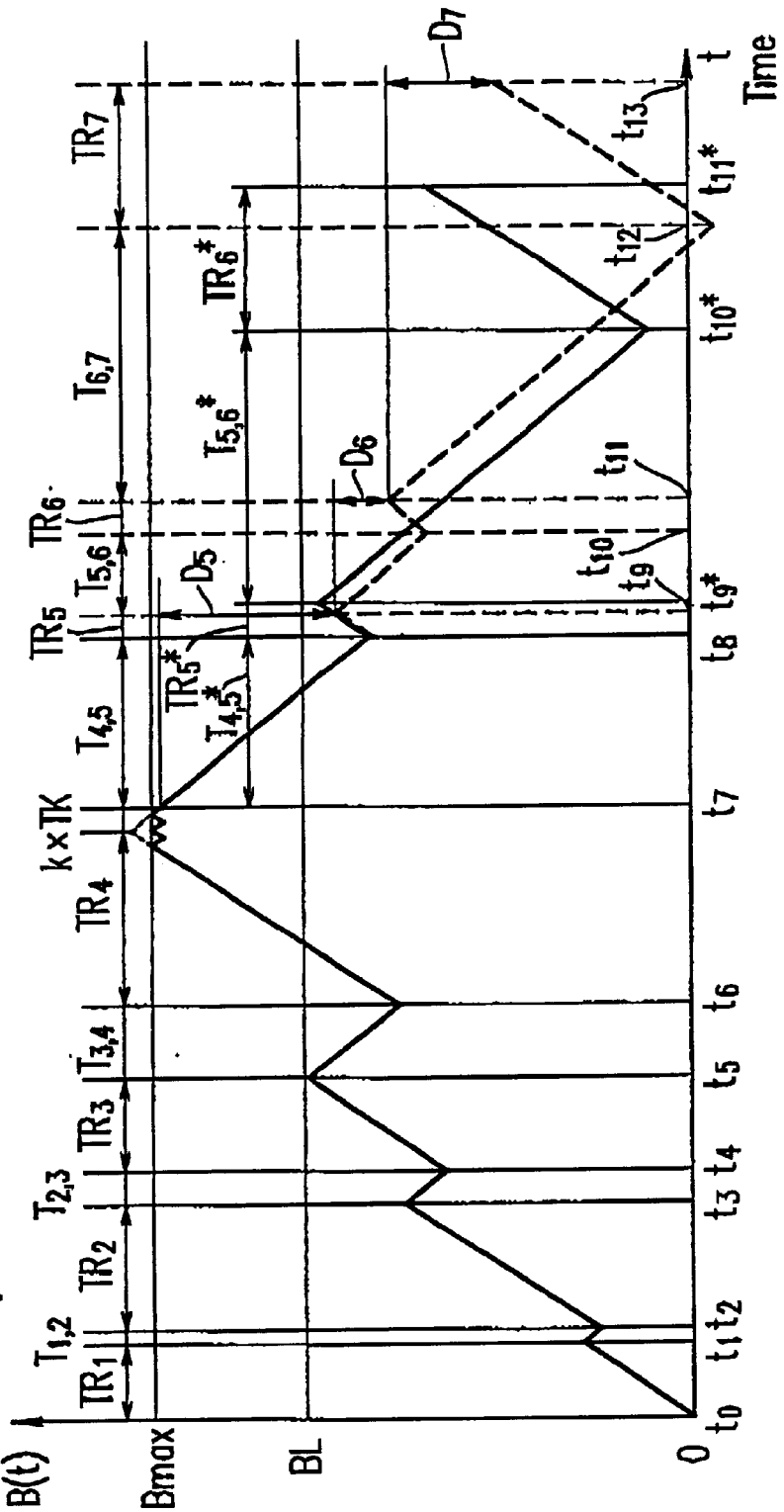
FIG. 6 shows a transition in the amount of data in a buffer memory as calculated by the recording method according to Example 1 of the present invention.

Next, the data amount calculation section 742 performs calculation processes from Steps S804 to S813 by using the read times and access times retained in the time information memory 752, and calculates the amount of data within the buffer memory at the time when the read for pre-allocated areas has completed. FIG. 6 shows a transition in the amount of data in the buffer memory as data in the pre-allocated areas is read. At time $t_1$, which is after reading of the pre-allocated area $A_1$, the data amount has increased at a rate of (Vin−Vout), over the time period $TR_1$ (Step S804).

Since the buffer memory of an actual reproduction apparatus is finite, it is necessary to consider the operation at an upper limit of buffer size. Therefore, it is checked whether or not the calculated data amount exceeds the buffer size Bmax (Step S805).

If overflow does not occur, then, it is checked whether or not the total calculated size of the pre-allocated areas well exceeds the size of data to be recorded SR, which was previously set at Step S801. By allocating sufficient recordable areas as pre-allocated areas, it is ensured that there will always be enough recordable areas even if areas in which data cannot be recorded due to dust or scratches are avoided during actual recording (Step S807).

If the total calculated size of pre-allocated areas does not exceed SR, then it is checked whether or not the calculated data amount exceeds an allocation level BL (=Vout×TL). If the amount of data within the buffer exceeds BL, then underflow will never occur when any area on the disk is accessed from the end of this pre-allocated area. Therefore, the first pre-allocated area to this pre-allocated area are determined as areas which will not cause underflowing, and hence these areas are registered as empty extents in which real-time data can be recorded. Thus, the subsequent step can be performed in a more efficient manner. When conducting a search for areas associated with underflowing, for example, it is possible to exclude the areas that have been registered as empty extents (Step S809) from those which are searched.

Next, the amount of data within the buffer memory at the time of starting a read of pro-allocated areas is calculated. At time $t_2$ in FIG. 5A, which is before reading the pre-allocated area $A_2$, the data amount has decreased at a rate of Vout, over the time period $T_{1,2}$ (step S811).

It is checked whether or not the calculated data amount has a negative (−) value. If the calculated data amount has a negative (−) value, it means that a buffer underflow will occur responsive to this access, so that the data reproduction will be interrupted (Step S812).

If the calculated data amount does not have a negative (−) value, the control proceeds to the beginning of Step S804. In FIG. 6, the pre-allocated areas $A_2$ to $A_4$ are calculated while repeating Steps 804 to S812.

With reference to Step S805, the data may overflow the buffer at the tail end of the pre-allocated area $A_4$, as shown in FIG. 6. In this case, the optical disk drive 707 temporarily suspends the data reproduction operation in order to avoid data overflow; therefore, a minimum rotation wait time is added to $TR_4$. Accordingly, the calculated data amount in corrected on the assumption that the data has decreased at a rate of Vout over a period of K×TK, where TK represents a rotation wait time at the outermost periphery of the information recording medium, and k=ip ((B(t)−Bmax)/(Vout× TK)+1)), where ip(x) is a function which extracts an integer portion of x. B(t) represents a data amount when overflow occurs. However, in order to simplify the data amount correction calculation, Bmax may be regarded as the data amount when overflow occurs, although this will result in a lower calculation accuracy (Step S806).

Since the data amount exceeds the allocation level BL at time $t_7$, the pre-allocated areas $A_1$ to $A_4$ are allocated as empty extents $E_1$ to $E_4$, and the location information there of is stored in the empty extent memory 751 (step S810).

In FIG. 6, the data amount calculation results in the case of reading the pre-allocated areas $A_5$ to $A_7$ are shown by dotted lines. A data underflow occurs at time $t_{12}$. In this case, the pre-allocated area which is most responsible for the underflow is excluded from allocation, and the control proceeds to the beginning of Step S811. The pre-allocated area which is most responsible for the underflow can be determined based on $D_1$, which represents a decrease in the data amount that occurs between accessing the beginning of an pre-allocated area $A_1$ and finishing data read from this area. By calculating the decrease for each pre-allocated area and finding a pre-allocated area which has the largest decrease, the pre-allocated area which is most responsible for the data underflow can be known.

Specifically, $D_5$, $D_6$, and $D_7$ in FIG. 6 are calculated. Since $D_5$ is the largest among the three, the pre-allocated area $A_5$ is excluded from allocation. In other words, in FIG.

Figure 5B:
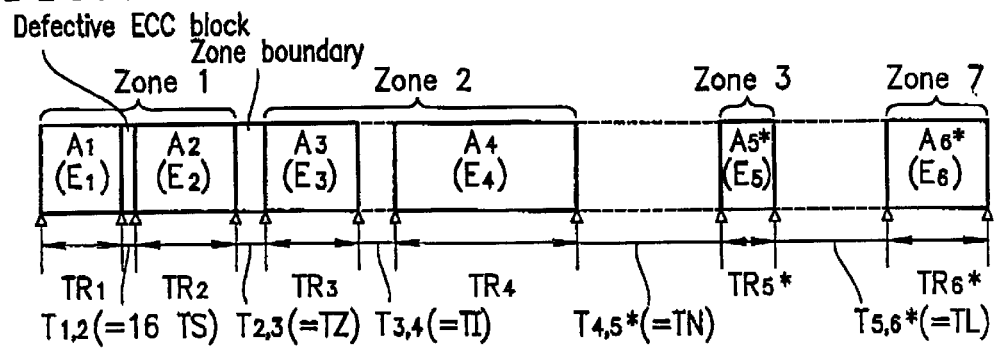

5B, the area numbers are updated so that the old pre-allocated areas $A_6$ and $A_7$ become new pre-allocated areas $A_5^*$ and $A_6^*$, respectively. Furthermore, as shown in FIGS. 4 and 5B, an access time $T_{4,5}^*$ between the pre-allocated areas $A_4$ and $A_5^*$ is calculated, and the old read times $TR_6$ and $TR_7$ are renumbered as new read times $TR_5^*$ and $TR_6^*$, respectively, and the access time $T_{6,7}$ is renumbered as a new access time $T_{5,6}^*$. Since this method takes into account access times, a higher calculation efficiency is provided than by methods in which the pre-allocated areas are omitted one by one from calculation in an ascending order of size (i.e., smaller areas first). If an underflow still occurs after the area associated with the largest decrease in data amount is omitted from the calculation, the area associated with the second largest decrease in data amount in omitted from the calculation, and so an (Step S813).

Next, the calculation of Step S811 is resumed at time $T_{4,5}^*$. After an increase in data amount from the pre-allocated area $A_6^*$ is calculated, since the total size of the pre-allocated areas exceeds the size of data to be recorded SR, the pre-allocated areas $A_5^*$ and $A_6^*$ are allocated as empty extents $E_5$ and $E_6$, and the location information there of is stored in the empty extent memory 751, and the control proceeds to Step 814. Through the flow of control up to this step, areas in which real-time data can be recorded have been determined (Step S808).

In order to indicate that the allocated empty extents are in fact pre-allocated for recording real-time data, the file structure processing section 746 generates a file entry for the VIDEO.VRO file containing location information of the empty extents, and instructs the data recording section 747 to record data on the disk, so that the file entry is recorded on the dick by the optical disk drive 707. In the case where the system controller accomplishes recording of a plurality of files in a multi-task environment, the process from Steps S802 to S813 may be performed as one process that has precedence over other tasks, and the determined empty extents are registered on the optical disk during this step. As a result, in a multi-task environment, too, the data of general files can be prevented from being erroneously recorded in any empty extents determined through the calculation (Step S814).

Figure 5C:
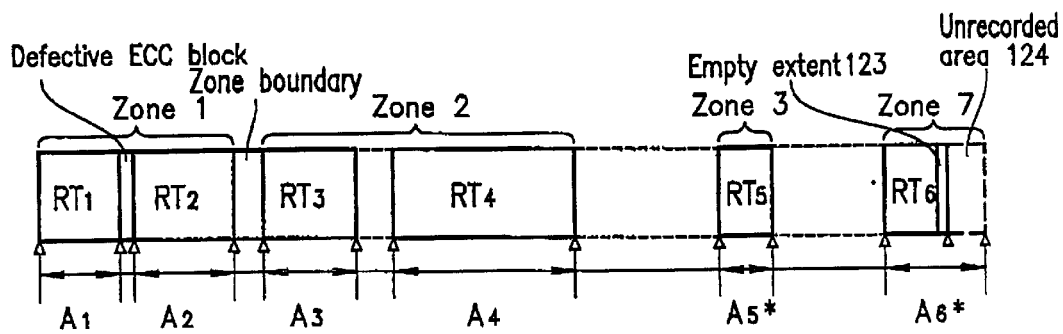

An audio/video signal which is input from the tuner 710 in encoded by the encoder 709 into AV data by a variable length compression method, and transferred to the data buffer memory 757. The file structure processing section 746 instructs the data recording section 747 to record the AV data in an already-allocated empty extent , and the AV data is recorded without a replacement process to a spare area. Since the data recording performance which is determined as a function of an access performance and data read performance of th e optical disk drive 707 and the size of the reproduction buffer memory 757 satisfies a predetermined data reproduction performance that can be achieved by a playback reference model during data recording, the data buffer memory 757 is not overflowed during data recording As shown in FIG. 5C, the empty extents $E_1$ to $E_5$ in which real-time data has been recorded become real-time extents $RT_1$ to $RT_5$, respectively. Since each empty extent is allocated by using the fixed data transfer rate Vout, which supports the optimum sound/image quality, a region thereof will be left unused after completion of the recording of AV data. Accordingly, a region in the empty extent $E_6$ in which data has been recorded becomes a real-time extent $RT_6$. If a region of an ECC block is left without any AV data recorded therein, as may happen at the end of any given AV data to be recorded, such a region becomes an empty extent 123. If one whole ECC block is left without any AV data recorded therein, such an ECC block becomes an unused area 124 (Step S815).

In order to reinstate the unused area 124 as a recordable area, the file structure processing section 746 updates the data on the bit map memory 756, and generates a file entry for the VIDEO.VRO file (composed of the real-time extents $RT_1$ to $RT_5$ and the empty extent 123) on the file structure memory 755. The data recording section 747 instructs the optical disk drive 707 to record these space bit map and file entry in predetermined positions. As a result, the space bit map 141 and the file entry 148 as shown in FIG. 1 are recorded (Step S816).

Thus, as described above, predetermined parameters are set according to user instructions at Step S801; information concerning non-contiguous areas on the optical disk is acquired from the optical disk drive 707 at Step S802; and areas from which data can be continuously reproduced are finalized as empty extents at Steps S803 to S814. As a result, the optical disk drive 707, the control system, and the application can be separately implemented. Therefore, the recording method according to the present invention can be easily implemented in a computer system in which an optical disk drive, a control system (including the operating system (OS)), and applications are separately provided. Since steps S803 to S814 and step S816 can be realized by using standard file system drivers which are provided in each OS, it is possible to handle recording of general files and real-time files by using standard file system drivers which are provided in each OS, thereby facilitating the development of application software for recording/edition of video data.

Next, features of the information recording medium according to the present invention will be described with reference to the playback reference model illustrated in FIG. 2A and the real-time extent arrangement illustrated in FIG. 5C. Each real-time extent is composed of a logically and physically contiguous area so that it is possible to calculate any decrease in data amount within the buffer memory occurring responsive to access by a pickup of the optical disk drive.

An increase (D(i)) in the amount of data having been stored in the buffer memory responsive to the playback reference model reading the data from an it real-time extent is:

$$D(i)=(Vin-Vout) \times S(i/Vin,$$

where S(i) represents the data size of an $i^{th}$ real-time extent; and

T(i) represents a time required for a pickup of the playback reference model to access from the end of the $i^{th}$ real-time extent to the beginning of an $(i+1)^{th}$ real-time extent.

The amount of data which is consumed from within the buffer memory when the playback reference model accesses from the end of the $i^{th}$ real-time extent to the beginning of the $(i+1)^{th}$ real-time extent is $-Vout \times T(i)$.

Therefore, assuming that B(0)=0, the amount of data (B(i)) which has been stored in the buffer memory when the playback reference model accesses from the end of the $i^{th}$ real-time extent to the beginning of the $(i+1)^{th}$ real-time extent is:

$$B(i)=B(i-1)+D(i)-Vout \times T(i).$$

Since the $i^{th}$ real-time extent which was recorded to by the above recording method is positioned so that a buffer overflow will not occur, D(i) is subjected to the following correction concerning overflow conditions.

When $D(i) > \text{Bmax} - B(i-1)$, $D(i) = \text{Bmax} - B(i-1)$, or $D(i) = (\text{Vin} - \text{Vout}) \times S(i)/\text{Vin} + B(i-1) - k \times (\text{Vout} \times \text{Tk})$.

In the above equation, k represents an integer portion of $((D(i)+B(i-1)-\text{Bmax})/(\text{Vout} \times \text{Tk})+1)$.

In order to prevent a buffer underflow, the $(i+1)^{th}$ real-time extent is positioned at a position satisfying a real-time reproduction condition defined as:

$T(i) \leq (B(i-1)+D(i))/\text{Vout}$.

In other words, since the real-time extents $RT_1$ to $RT_6$ in FIG. 5C are positioned so as to satisfy the real-time reproduction condition defined above, it is possible for an actual reproduction apparatus which satisfies the performance of the playback reference model to continuously reproduce video data and audio data from this real-time extent. In the determination as to whether the $(i+1)^{th}$ pre-allocated area can be allocated as an empty extent in Steps S804 to S814, the aforementioned real-time reproduction condition can be conveniently used to facilitate the determination.

Now, referring to FIGS. 7A, 7B, and 7C, attribute information according to the present invention to be registered in the file entry for real-time files (which has been recorded in Step S816) will be described. FIG. 7A is a data structure diagram illustrating the file entry for a real-time file. In the beginning of the file entry is recorded a descriptor tag identifying this descriptor as a file entry. At byte position (hereinafter referred to at "BP") 16 is recorded an ICB tag for recording attribute information of a real-time file. At BP 56 is recorded the information length of the file body for identifying the file body from the file tail. At BP 112 is recorded an extended attribute ICB for recording location information for designating, in the case where the extended attribute information (recorded at BP176) becomes too large to be recorded within the file entry, where to record the extended attribute information. At BP168 is recorded the length of the extended attribute recorded at BP176 (=L_EA). At BP172 is recorded the entire length of an allocation descriptor which is recorded in byte positions following L_EA. At BP176 is recorded an extended attribute. In the byte positions following L_EA is recorded an allocation descriptor.

In the byte positions following L_EA, short allocation descriptors for real-time extents $RT_1$ to $RT_6$ and an empty extent 123 are recorded. Real-time extents and empty extents are distinguished from one another based on the value("0" and "1", respectively) of the most significant 2 bits of the extent length recorded at relative byte position (hereinafter referred to as "RBP") 0 of each short allocation descriptor. Furthermore, the real-time extents $RT_1$ to $RT_6$ are recorded in the file main body, whereas the empty extent 123 is recorded in the file tail.

At RBP1 of the ICB tag which is recorded in the file entry for a real-time file, a file type value "249" is recorded to indicate that the file entry represents a real-time file. Based on the file type value, it can be determined whether or not real-time data (which requires continuous reproduction) to recorded in the file. RBP18 of the ICB tag is a flag field, in which bit 4 indicates whether or not re-allocation is permitted. Bit 4 is set to "1" to indicate that the real-time extents are positioned 80 as to satisfy the real-time reproduction condition according to the present invention so far as this file is concerned. Bit 4 is reset to "0" if the real-time files have been copied without considering the real-time reproduction condition. thereby providing a means for indicating that the positioning of real-time extents is no longer appropriate. This bit can also be utilized to prevent a utility such as a defragmentation utility from undesirably changing the positioning of real-time files.

In an extended attribute for allocation that is recorded in the file entry for a real-time file, parameters used when allocating the respective extents of the real-time file are recorded. That is, a data transfer rate Vin is recorded at RBP0; a data transfer rate Vout it recorded at RBP2; a buffer memory size is recorded at RBP4; an access type for identifying each access performance type rate is recorded at RBP6; and access times are recorded at RBP8 and the subsequent relative bit positions. In the case of the access performance according to the present example, "1" is recorded as the access type, and the values of TZ, TI, and TL are recorded as access times Ta, Tb, and Tc, respectively. In the case of the access performance of a DVD-R which is described in Example 2, "2" is recorded as an access type.

Next, a method for reproducing real-time data from the information recording medium shown in FIG. 1 by using the information recording/reproduction apparatus according to one embodiment of the present invention, in accordance with the block structure illustrated in FIG. 3 and the flow-chart illustrated in FIG. 8, will be described. The optical disk drive 707, which satisfies the access performance of the playback reference model, is capable of reading data at a predetermined data transfer rate Vin. The data buffer memory 757 has a size which to equal to or greater than that of the buffer memory 303 of the playback reference model. Thus, the information recording/reproduction apparatus satisfies the predetermined performance of the playback reference model.

In the case where the information recording/reproduction apparatus has an access performance such that it is capable of faster access than the predetermined access performance of the playback reference model, it is possible to reduce the size of the data buffer memory 757 so as to be smaller than that of the buffer memory 303 of the playback reference model.

The file structure processing section 746 instructs the data read section 748 to read the volume structure area 104 and the file structure area 105, and the data which in read by the optical disk drive 707 is transferred to the file structure memory 755 for analysis. Among the data which has been read, the location information and attribute information of real-time extents are stored in the file structure memory 755 (Step S901).

The file structure processing section 746 determines whether or not this file is a real-time file based on the file type which is recorded in the ICB tag shown in FIG. 7A, and confirms whether or not the real-time extents are positioned so as to satisfy the real-time reproduction condition based on the non-relocatable bit (Step S902).

In the case where the file is a real-time file, the reproduction mode informing section 741 informs the allocation parameters which are recorded in the extended attribute in the file entry to the optical disk drive 707. Then, the optical disk drive 707 determines whether the real-time file can be reproduced or not (Step S903).

The data read section 748 issues a reproduction command for real-time data to the optical disk drive 707 (Step S904).

In accordance with the issued reproduction command, the optical disk drive 707 reads data from the real-time extents. During a reproduction operation from real-time extents, the location information of any defective sectors which have been subjected to a replacement process is ignored; and even if an error occurs during data reproduction, continuous data reproduction is performed without performing any recovery process. The data which has been read is temporarily transferred to the data buffer memory 757, so that video data and audio data are reproduced on the TV set via the decoder 711, which corresponds to the decoder module in the playback reference model (Step S905).

In the case where the file is a general file, the data read section 748 issues a reproduction command for general data to the optical disk drive 707 (Step S906).

In accordance with the issued reproduction command for general data, the optical disk drive 707 reads data. The data which has been read is temporarily transferred to the data buffer memory 757,(Step S907).

Thus, the information recording/reproduction apparatus can reproduce the data continuously from real-time extents which are positioned so as to satisfy the real-time reproduction condition, because the information recording/reproduction apparatus satisfies the predetermined performance of the playback reference model.

Although the present example is directed to an optical disk of the ZCLV format, the present invention is also applicable to any DVD-RW disk or hard disk whose defect management processing is handled by a system controller. In the case of a DVD-RW, defeat management is performed based on a file system, and the location information of any sectors that are replaced by spare areas is managed based on a sparing table. Therefore, at Step 802, it is possible to search for logically and physically contiguous unallocated areas from a space bit map.

Although the present example illustrates the case where the file structure area is a single continuous region, the respective descriptors may be distributed throughout the disk without undermining the effects of the present invention.

(EXAMPLE 2)

Example 2 illustrates an instance in which new real-time data is appended to a real-time file which is already recorded on a DVD-R disk.

In the course of our description, the block structure of an information recording/reproduction apparatus shown in FIG. 9, and a playback reference model and access performance in accordance with this information recording/reproduction apparatus will be first described with reference to FIG. 10. Then, a method for appending data to a real-time file will be described with respect to an area structure shown in FIG. 13 and data amount transition within a buffer during reproduction shown in FIG. 12. Next, a linking scheme for recording AV data will be described with reference to FIG. 14. Then, the data structure of the optical disk will be described with a focus on file management information. Finally, a reproduction method will be described with reference to the flowchart shown in FIG. 8.

Figure 9:
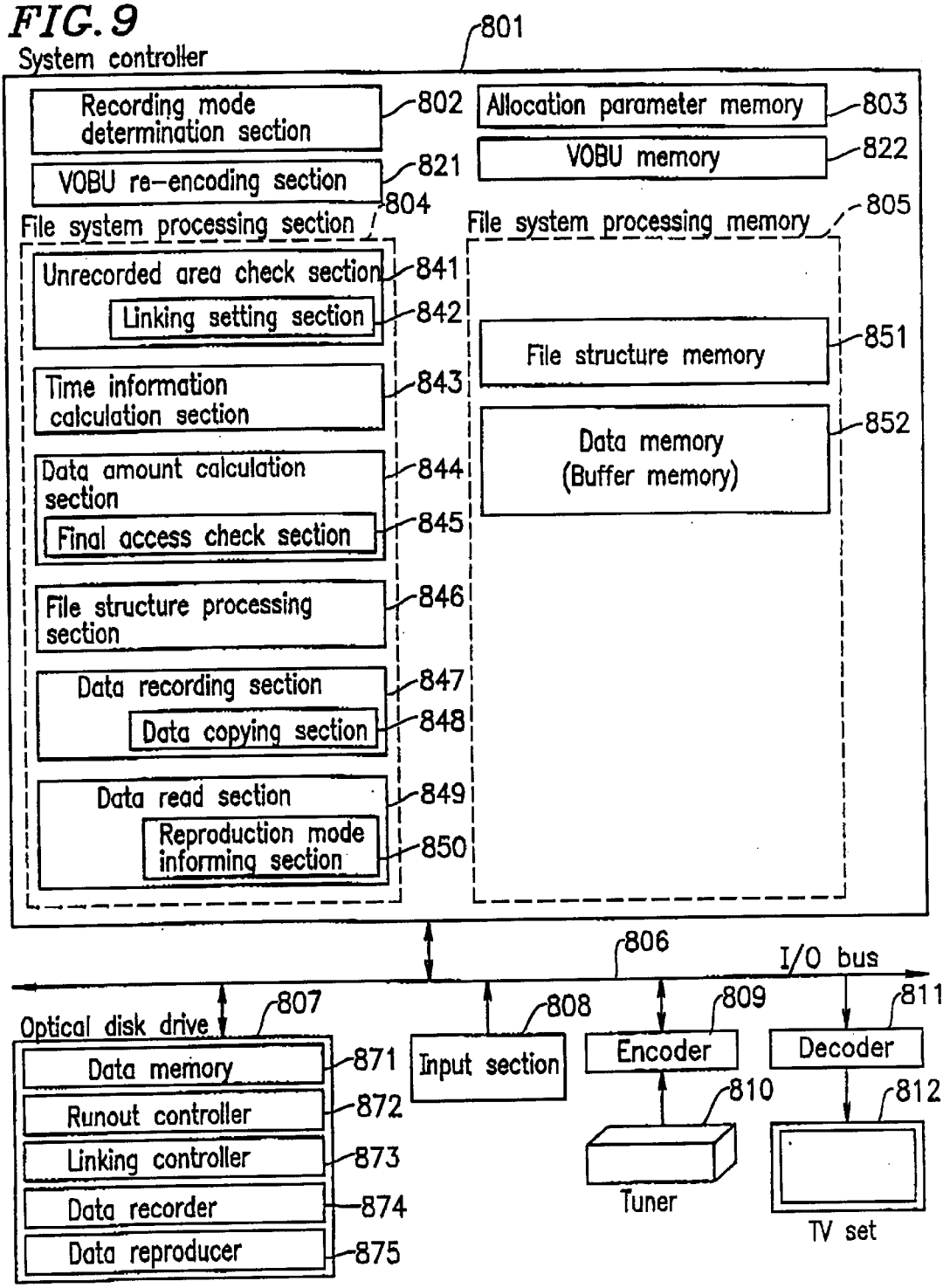
FIG. 9 is a block diagram of an information recording/reproduction apparatus according to the present invention.

FIG. 9 is a block diagram illustrating an information recording/reproduction apparatus according to one embodiment of the present invention. The information recording/reproduction apparatus includes a system controller 801, an I/O bus 806, an optical disk drive 807, an input section 808 for inputting recording modes, etc., a tuner 810 for receiving TV broadcast programs, an encoder 809 for encoding video/audio signals into AV data, and a decoder 811 for decoding the AV data and outputting the decoded AV data to a TV set 812. In the case of a personal computer, the respective sections in the system controller 801 as shown in FIG. 9 may be implemented by a main CPU. Although discrete memories dedicated to different purposes are described, they may be realized on one memory circuit. In the case of a video recorder which integrates the system controller 801 and the optical disk drive 807, the various sections within the system controller 801 and the optical disk drive 807 may be implemented by a single CPU.

The system controller 801 includes: a recording mode determination section 802, an allocation parameter memory 803, a VOBU (video object unit) re-encoding section 821, a VOBU memory 822 for re-encoding VOBUs, a file system processing section 804, and a file system processing memory 805. In the case of a PC system, the recording mode determination section 802 and the VOBU re-encoding section 821 may be implemented by application software, and the file system processing section 804 may be implemented by using standard file system drivers which are provided in each OS.

The file system processing section 804 includes an unrecorded area check section 841, which in turn includes a linking setting section 842 for designating a linking scheme and data recording start locations; a time information calculation section 843 for calculating time information concerning reading of extents and access; a data amount calculation section 844, which in turn includes a final access check section 845 for calculating the presence or absence of a buffer underflow during access to a data recordable area which is set within an unrecorded area; a file structure processing section 846; a data recording section 847, which in turn includes a data copying section 848 for copying already-recorded data to an unrecorded area in the case where a buffer underflow occurs; and a data read section 849, which in turn includes a reproduction mode informing section 850 for switching between reproduction modes for AV data and non-AV data. The file system processing memory 805, which is utilized by these sections includes a file structure memory 851, and a data memory 852, which also serves as a buffer memory.

Figure 10A:
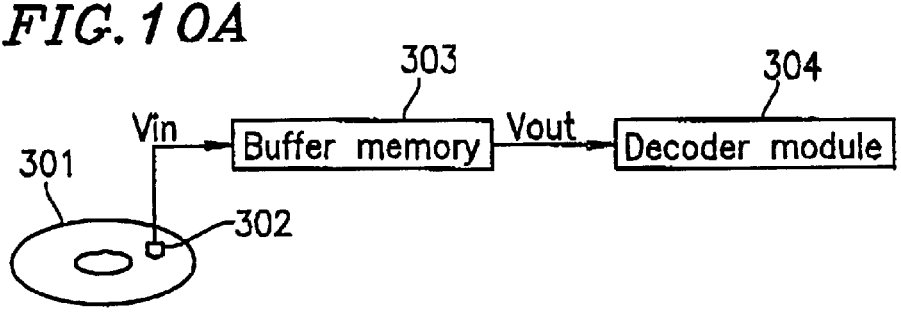
FIGS. 10A and 10B illustrate the structure of a playback reference model and its access performance, respectively, according to Example 2 of the present invention.
Figure 10B:
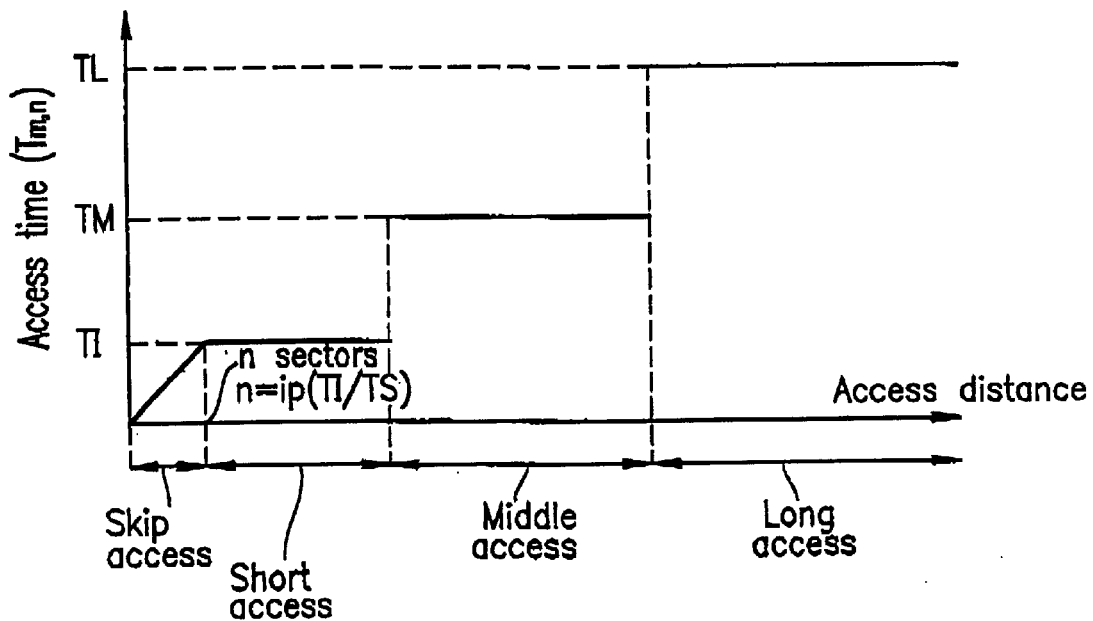

The optical disk drive 807 includes a data memory 871 for temporarily storing data to be recorded or reproduced; a runout controller 872 for controlling data to be recorded in a runout area; a linking controller 873 for controlling data append in a linking scheme; a data recorder 874 for controlling data recording; and a data reproducer 875 for controlling data reproduction. It is ensured that the access performance and the data recording rate of the optical disk drive 807 and the size of the data buffer memory 852 are chosen so as to provide a data recording performance which satisfies a level of recording performance that would be attained by using the playback reference model for recordings FIGS. 10A and 10B illustrate a playback reference model and its access performance for determining conditions for positioning the real-time data according to one embodiment of the present invention, respectively. The playback reference model illustrated in FIG. 10A is the same playback reference model as that described in Example 1. A buffer memory 303 and a decoder module 304 shown in FIG. 10A are implemented as data the data memory 852 and the decoder 811, respectively.

FIG. 10B is a graph illustrating a relationship between access distances and access times during an access made to a DVD-R disk by a pickup 302 in the playback reference model. It should be noted that, the graph of FIG. 10B illustrates different access times from those illustrated in Example 1 (FIG. 2B), which was directed to a DVD-RAM disk, because a different access performance is required of a reproduction apparatus for DVD-R disk due to the physical structure of the disk medium. The access times are conveniently divided into four access categories, depending on the access distance: skip access, short access, middle access, and long access, although the actual access performance will present a non-linear profile. Any access occurring at the ECC block level is defined as a skip access.

Next, in accordance with a flowchart shown in FIG. 11, a recording method will be described with respect to an area structure shown in FIG. 13 and data amount transition within a buffer during reproduction shown in FIG. 12. The following example illustrates a method for appending AV data to a real-time file which is composed of real-time extents $RT_1$ and $RT_2$ that have already been recorded. In order to permit the appended AV data and the already-recorded AV data to be reproduced in a seamless manner, real-time extents are allocated under the real-time reproduction condition as described in Example 1.

A recording mode and a recording time are designated via the input section 808, which may be implemented as a remote control, a mouse, or a keyboard. The recording mode determination section 802 first determines whether the data to be recorded is AV data or not, and performs the subsequent steps if the data to be recorded is AV data. If the data to be recorded is AV data, the recording mode determination section 802 determines Vout, which defines a maximum data transfer rate; Vin, which defines a read rate from the disk; size SR of data to be recorded; a buffer size Bmax; and various access times, and store these values in the allocation parameter memory 803 (Step S401: determination of recording parameters).

The unrecorded area check section 841 acquires the size of an unrecorded area 553 (shown in FIG. 13A) from the optical disk drive 807 to confirm that this size is sufficiently greater than the size of data SR (=Vout×recording time) to be recorded. After the AV data, a file entry for the real-time file to be updated and file management information such as VAT ICB and VAT are recorded along with a linking loss extent (32 KB). For example when closing the disk, a border out is further recorded. Therefore, a sufficient data recordable area is required for the AV data to be recorded.

In order to realize a seamless reproduction between the file tail of a real-time file and the beginning of the appended AV data, the VOBU re-encoding section 821 reads the last VOBU in the last real-time extent. The last VOBU is re-encoded by the encoder 809 so as to be able to be recorded in the unrecorded area along with the new AV data. The re-encoded VOBU is retained in the VOBU memory 522.

As used herein, a video object unit (VOBU) is MPEG data which is composed of a number of GOPs (group of pictures) within AV data Which has been compressed in the MPEG format. Since MPEG data includes video information and audio information that are recorded with a certain time offset, any appended AV data must be recorded while keeping this offset intact in order to be able to be reproduced in a seamless manner. Accordingly, as described above, the last VOBU which has been read is re-encoded along with the new AV data to be recorded, and re-recorded in the unrecorded area.

The file structure processing section 846 instructs the data read section 849 to read the volume structure area and the file structure area (described later), and the data which has been read by the optical disk drive 807 is analyzed on the file structure memory 851, whereby the locations of all real-time extents (i.e., $RT_1$ and $RT_2$ in this example) in the real-time file are determined. At this time, real-time extents $RT_i$, except for the last extent, are allocated as pro-allocated areas $A_i$ (i=1 to n−1; n is 2 in the example shown in FIG. 13), and the portion of the last real-time extent $RT_n$ excluding the VOBU which has been read is allocated as a pre-allocated area $A_n$. Moreover, the linking setting section 842 sets a linking loss extent 555 (described later) for the unrecorded area, while allocating the remainder as a pre-allocated area $An_{n+1}$.

Figure 13A:
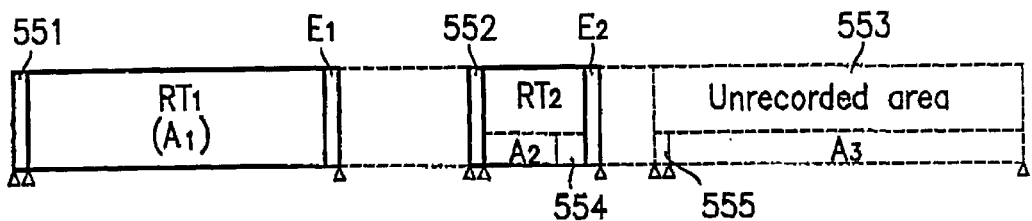
FIGS. 13A to 13D are diagrams illustrating an exemplary area arrangement allocated for a real-time file in accordance with the recording method according to Example 2 of the present invention.

In FIG. 13A, a linking lose extent 551 and an empty extent $E_1$ are areas which were formed when the real-time extent $RT_1$ was recorded. Similarly, a linking loss extent 552 and an empty extent $E_2$ are areas which were formed when the real-time extent $RT_2$ was recorded. An empty extent is an area spanning between a sector in which data is recorded and an ECC block boundary. Reference numeral 554 represents an area in which the VOBU that has been read is recorded. Reference numeral 555 represents a linking loss extent which is set within the unrecorded area 553. The pre-allocated areas which are allocated during this step are denoted as $A_1$, $A_2$, and $A_3$ (Step S402: check for unrecorded areas).

Figure 13B:
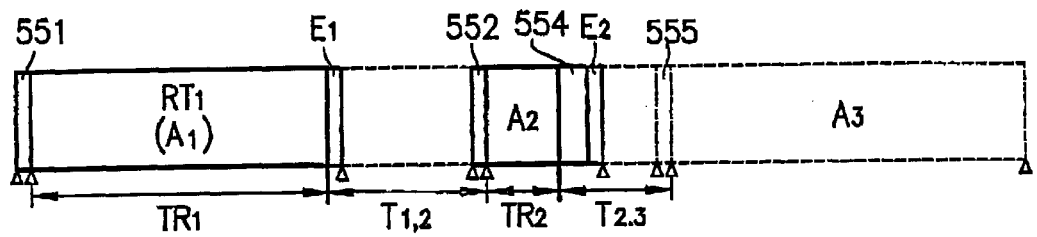

The time information calculation section 843 calculates a read time $TR_i$ (where i corresponds to the area number $A_i$ for pre-allocated areas) required for reading each pre-allocated area at a data transfer rate of Vin (except for the last area) and an access time $T_{i,i+1}$ between pre-allocated areas (i.e., access time between pre-allocated areas $A_i$ and $A_{i+1}$), by using the location information of the pre-allocated areas and the various access times retained in the allocation parameter memory 803. In FIG. 13B, the read times $TR_1$ and $TR_2$ are times required for reading the pre-allocated areas $A_1$ and $A_2$, respectively. Access times $T_{1,2}$ and $T_{2,3}$ are calculated based on the access performance shown in FIG. 10B, where access time $T_{m,n}$ represents an access time from the end of a pre-allocated area $A_m$ to the beginning of $A_n$ (Step S403: calculation of read time information and access time information).

Next, the data amount calculation section 844 performs calculation processes from Steps S404 to S414 for the pre-allocated area that has been recorded, by using the read times and access times obtained at Step S403. FIG. 12 shows a transition in the amount of data in the buffer memory responsive to reading of the pre-allocated areas and accesses (calculation of data amount in the buffer for each recorded area).

First, the data amount (B(t)) in the buffer memory for the pre-allocated areas $A_l$ to $A_n$ in which AV data has already been recorded is calculated in accordance with the following steps. It is assumed that $t_{2i-2}$ and $t_{2i-1}$ represent data read start time and data read end time for an area $A_i$, respectively (Step S404).

The data amount in the buffer memory at the data read start time for an area $A_i$ is calculated as follows (Step S405):

$B(0)=0$ (for $A_1$)

$B(t_{2i-2})=B(t_{2i-3})-(Vout \times T_{i-1,1})$ (for $A_2$ and after).

The data amount in the buffer memory at the data read end time for an area $A_i$ is calculated as follows (Step S406):

$B(t_{2i-1})=B(t_{2i-2})+(Vin-Vout) \times TR_i$.

Next, it is checked whether or not the calculated data amount exceeds the buffer size Bmax If overflow does not occur, the area for which to perform the calculation is moved to a next area (Step S409), and the control returns to Step S404 (Step S407).

If the calculation result indicates overflow, the optical disk drive 807 temporarily suspends the data reproduction operation in order to avoid overflow. Therefore, a minimum rotation wait time is added. Accordingly, the calculated data amount is corrected on the assumption that the data has decreased at a rate of Vout over a period of k×TK, where TK represents a rotation wait time at the outermost periphery of the information recording medium, and k=ip ((B(t)−Bmax)/(Vout×TK)+1)). B(t) represents a data amount when overflow occurs. Next, the area for which to perform the calculation is moved to a next area (Step S409), and the control returns to Step S404 (Step S408).

Figure 12:
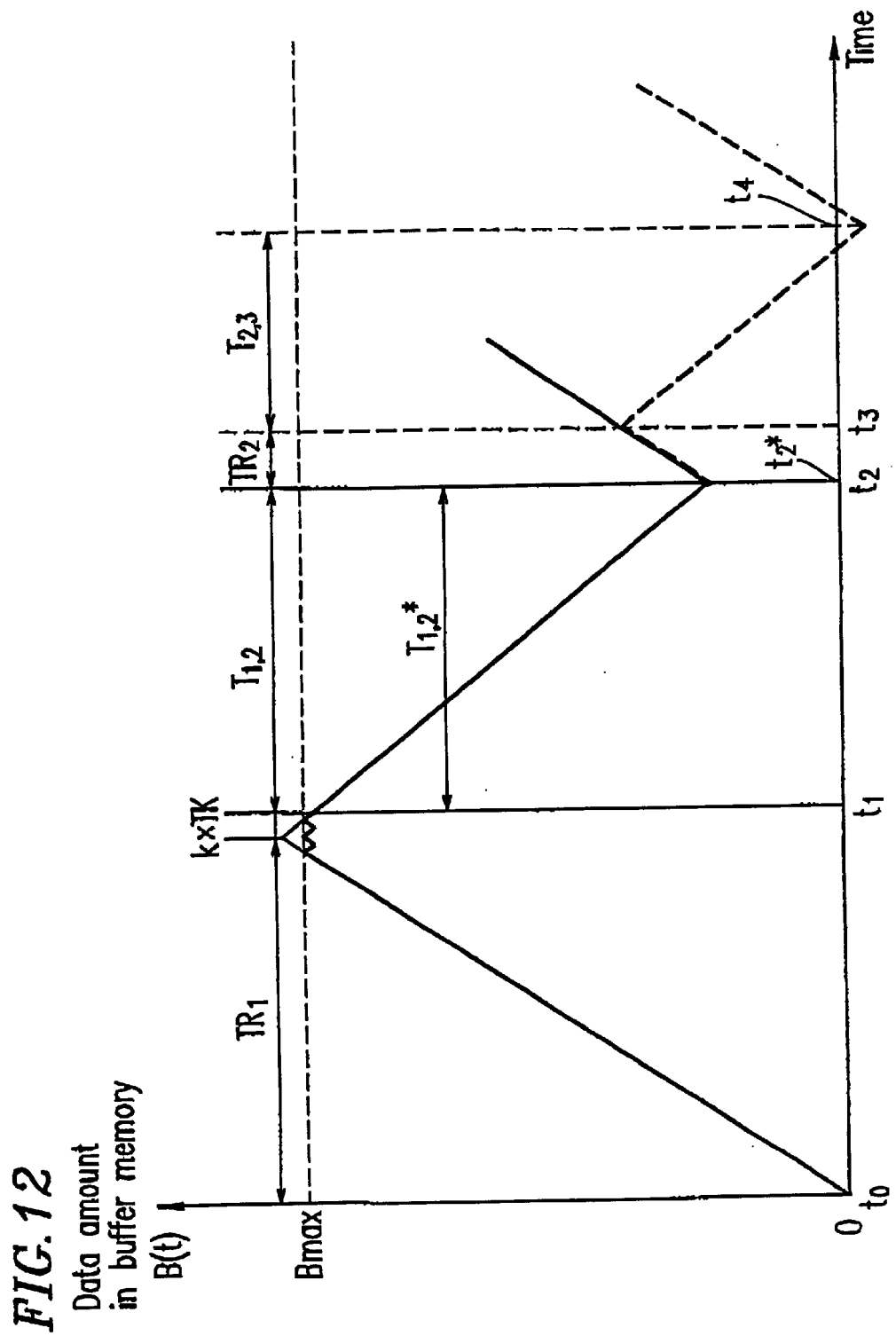
FIG. 12 shows a transition in the amount of data in a buffer memory as calculated by the recording method according to Example 2 of the present invention.

At time $t_1$ shown in FIG. 12, the data amount is corrected responsive to an overflow.

Next, by using Steps S410 to S414, the final access check section 845 calculates the data amount ($B(t_{2n})$) in the buffer memory at the data read start time for the pre-allocated area $A_{n+1}$, that has been set in the unrecorded area (calculation of data amount in the buffer at the beginning of the last pre-allocated area).

First, this data amount ($B(t_{2n})$) is calculated as follows (Step S410):

$$B(t_{2n}) = B(t_{2n-1}) - (Vout \times T_{n,n-1})$$

At this time, data underflow is checked for. If underflow does not occur, the control proceeds to Step S415 (Step S411).

If underflow occurs, those pre-allocated areas which result in a non-zero (i.e., more than zero) data amount even when accessing to the last pre-allocated are searched for, while excluding one after another pre-allocated area from this calculation from the outer periphery toward the inner periphery of the disk, until an area in which underflow will not occur. This search is performed as follows (Steps S412, S413, and S414):

```
for i = 1 to n-1 {
    B(t_{2n}) = B(t_{2n-1-2i}) - (Vout×T_{n-1,n+1}).
    If (B(t_{2n}) ≧ 0,
        A_{n+1} is updated to A_{n-j}* (where j = i-1);
        T_{n-1,n+1} is updated to T_{n-1,n-i+1}*; and
        the control proceeds to Step S415
}.
```

Figure 13C:
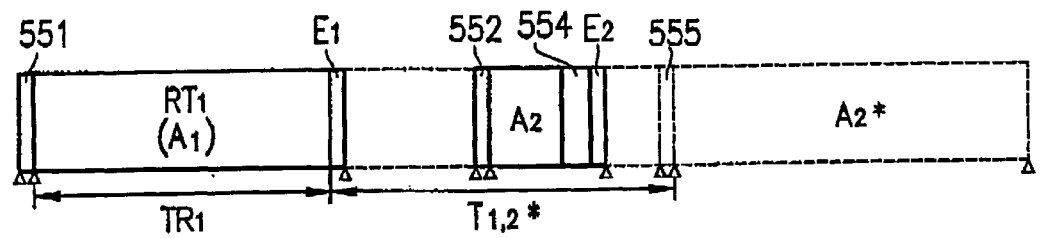
Figure 13D:
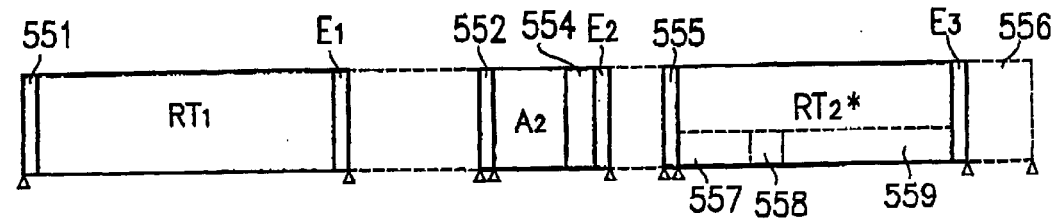

In the example illustrated in FIGS. 12 and 13C, since a data underflow occurs at time $t_4$, the pre-allocated area $A_2$ is excluded from the above calculation. Accordingly, $T_{1,3}$ is updated to $T_{1,2}^*$, and $A_3$ is updated to $A_2^*$, and the data amount after access from the end of the pre-allocated area $A_1$ to the beginning of $A_2^*$ is calculated. No underflow occurs when the pre-allocated area $A_2$ to excluded.

Next, the data copying section 848 copies the data recorded in the pre-allocated area $A_2$, which was excluded from the above calculation, to the pre-allocated area $A_2^*$ (in a portion denoted as 557 in FIG. 13D) so as to succeed the linking loss extent 555. The data recording section 847 records the re-encoded VOBU (in a portion denoted as 558 in FIG. 13D) and the AV data to be appended (in a portion denoted as 559 in FIG. 13D) so as to succeed the data recorded in the pre-allocated area $A_2$. The regions 557, 558, and 559 become real-time extents $RT_2^*$ (Step S415: recording of real-time data).

In the case where data is recorded to a DVD-R disk, the files are recorded by using a VAT system which is defined under the UDF specification. Therefore, a file structure associated therewith is recorded in the unrecorded area 556 (Step S416: update of file structure).

Thus, the arrangement of the real-time extents recorded in the aforementioned manner satisfy the real-time reproduction condition as described in Example 1 of the present invention.

Next, recording of real-time extents will be described with respect to the data structure of a linking scheme as shown in FIG. 14. The linking setting section 842 sets a linking loss extent 210 (32 KB), and records AV data. The linking loss extent 210 is composed of one ECC block with 00h being recorded in all sectors. The first sector defines a linking sector. Since the linking loss extent 210 and the real-time extent 211 are recorded so as to adjoin each other, no linking gap is formed at the boundary therebetween. As a result, the data reliability of the first sector is prevented from deteriorating.

Figure 14A:
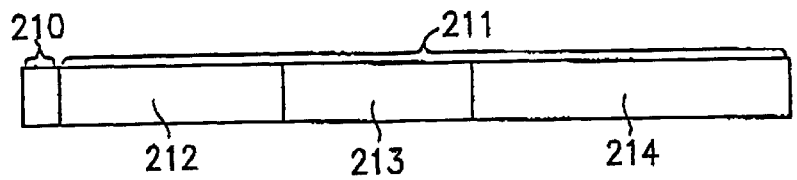
FIGS. 14A to 14E are data structural diagrams illustrating a linking scheme concerning real-time extents according to Example 2 of the present invention.
Figure 14B:
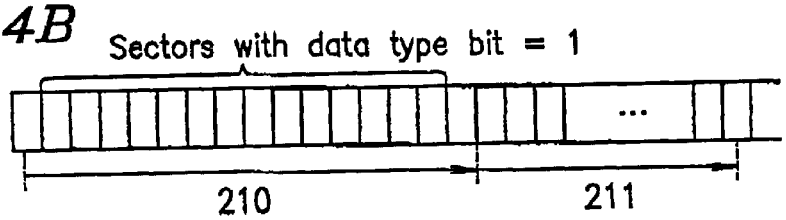
Figure 14C:
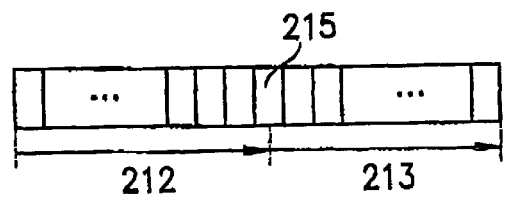
Figure 14D:
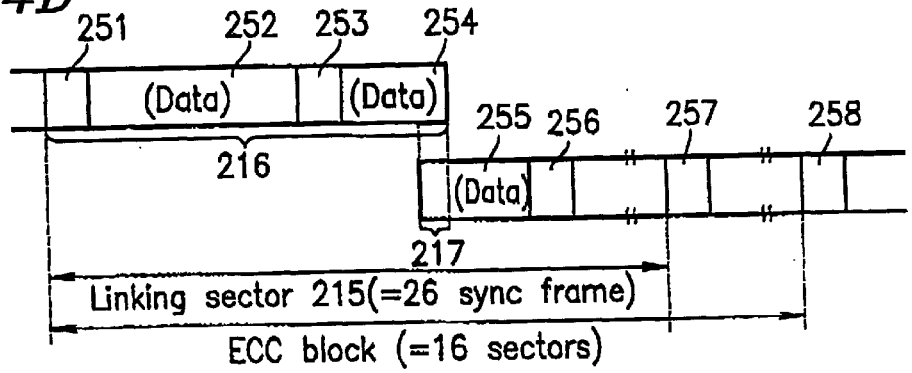

Next, a recording method in the case where a buffer underrun occurs between regions 212 and 213 will be described. A sector 215 is a linking sector. The specific data structure concerning sync frames is shown in FIG. 14D. Reference numerals 251, 252, 253, and 254 represent areas which are recorded at an end portion when the area 212 is recorded; 251 and 252 represent a sync portion and a data portion, respectively, of a first sync frame; and 253 and 254 represent a sync portion and a data portion, respectively, of a second sync frame. Reference numerals 255, 256, 257, and 258 represent areas which are recorded at a beginning portion when the area 213 is recorded. Reference numeral 255 represents a data portion in the second sync frame. Reference numerals 256, 257, and 258 represent sync portions in sync frames. The respective areas are sized au in the conventional example described earlier. Areas 216 and 217 are a runout area and a linking gap, respectively.

The runout controller 872 of the optical disk drive 807 always retains in the data memory 871 the data to be recorded to a next ECC block. Therefore, if a buffer underrun occurs during data recording, the data to be recorded in the runout area 216 is recorded, and the recording of the real-time extent 211 is temporarily suspended, and recording of the area 212 is completed. At this time, the data to be recorded in the ECC block, including the linking sector, is retained in the data memory 871. Next, when predetermined data is transferred from the system controller 801 to the data memory 871, the data recorder 874 records the remaining linking sector data from the linking gap 217, and continues data recording.

Figure 14E:
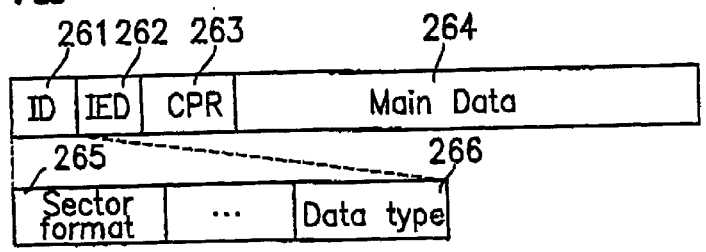

Thus, since AV data (which requires continuity) is recorded in contiguous sectors, any waste of recordable areas due to linking loss areas can be prevented. Whereas the aforementioned conventional linking scheme only permits 00h data to be recorded in the runout area, the linking scheme according to the present example of the invention allows actual data to be recorded in the runout area even in the presence of a buffer underrun. The portion in which data cannot be properly recorded is reduced to the few bytes which form as a linking gap. Therefore, even if a linking gap is formed within a real-time extent, an error correction based on ECC can be easily performed during data reproduction. Moreover, identification information is recorded in areas as illustrated in FIG. 14E, thereby making it possible for a reproduction drive apparatus to easily distinguish the previously-recorded linking lose extents from real-time extents.

Each sector of a DVD disk includes regions for recording physical additional information, i.e., ID 261, IED 262, and CPR 263, in addition to a Main Data region 264 for recording 2048 bytes of user data. The physical information concerning the sector is recorded in ID 261. An error detection code for the ID section is recorded in IED 262. Copy management information is recorded in CPR 263. ID 261 includes a sector format bit 265 and a data type bit 266. The sector format bit 265 indicates whether the disk is in the CLV format or in the zone format. The data type bit 266 is a bit which is set to "1" in the case where a next sector is included within a linking loss extent, unless the sector is a linking sector. As shown in FIG. 14B, the first sector in the linking loss extent has a "0" data type bit because it is a linking sector. The second to the 15th sector have a "1" data type bit because they belong in a linking loss extent.

Figure 15:
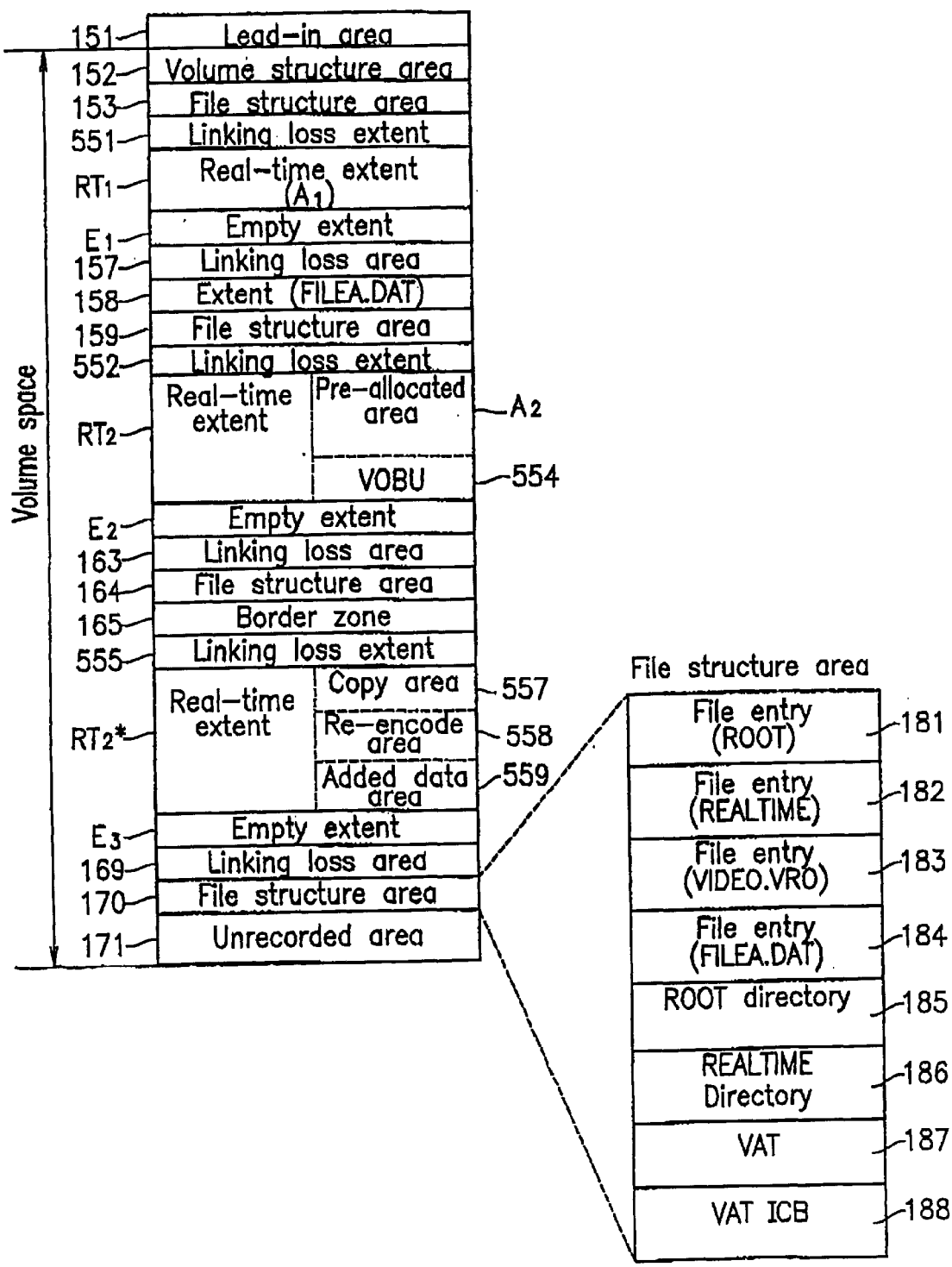
FIG. 15 is a data structural diagram illustrating area structures on the information recording medium according to Example 2 of the present invention.
Figure 16A:
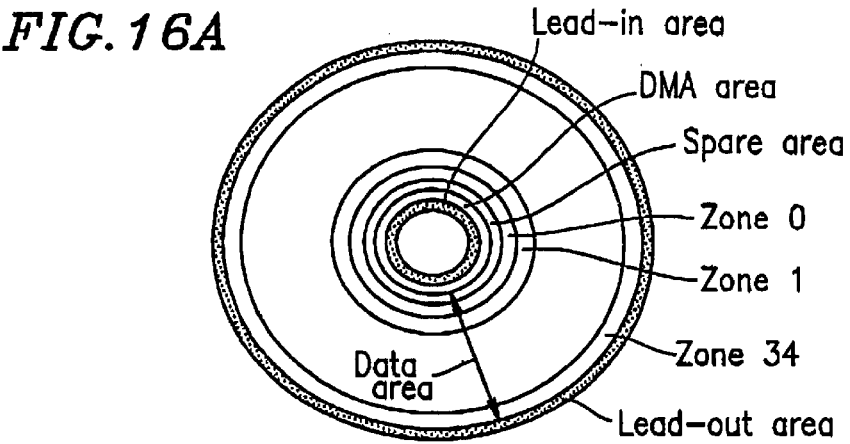
FIGS. 16A and 16B are data structural diagrams illustrating area structures on a conventional information recording medium.
Figure 16B:
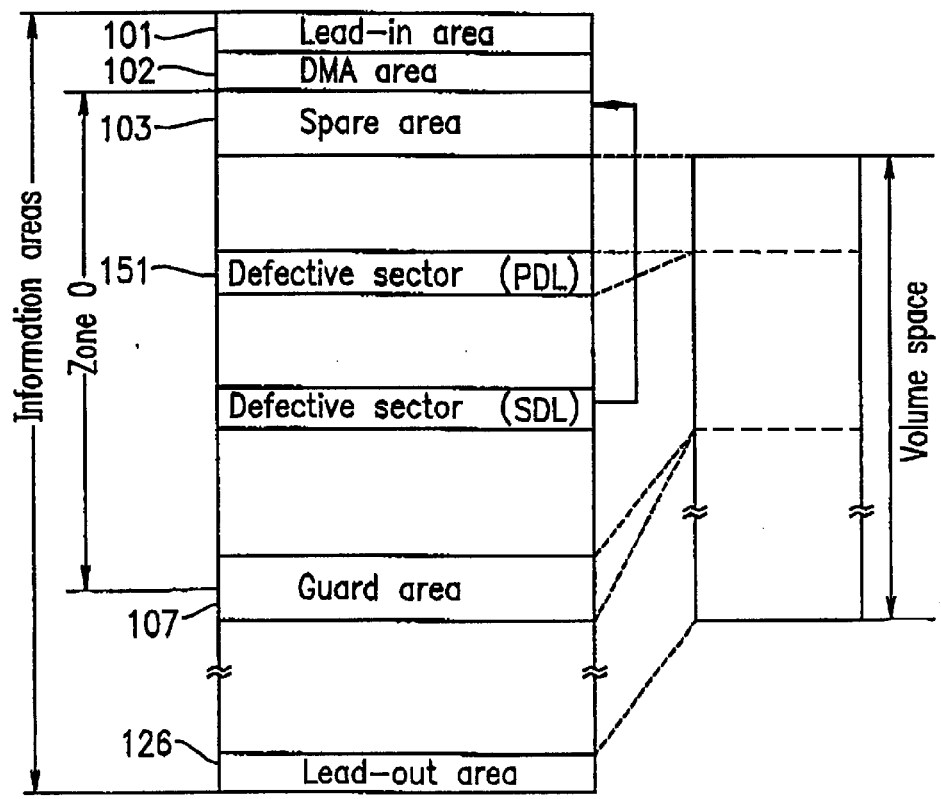

FIG. 15 shows an exemplary data structure of an information recording medium in which files managed based on volume/file structures under the UDF specification are recorded. The arrangement of areas in each real-time extent corresponds to that shown in FIG. 13. The upper portions in FIG. 15 correspond to the inner portions, and the lower portions in FIG. 15 to the outer portions, of a DVD-R disk. A volume space is defined as a region spanning from a volume structure area 152 to an unrecorded area 171, in which files and volume/file structures are recorded. From the inner periphery side, a lead-in area 151, a volume structure area 152 and a file structure area 153 (which are recorded at the time of formatting), and a linking loss extent 551, a real-time extent $RT_1$, and an empty extent $E_1$ (which are formed at the time of recording AV data) are provided in this order.

Then, a FILEA.DAT file, which contains data of a plurality of still images obtained from a digital camera or the like, is recorded. Since still image data requires more reliability than real-time reproducibility, an extent 168 is recorded so as to succeed a linking lose area 157, as in the case of general data. Furthermore, a file structure area 159 for managing the recorded file is recorded so as to succeed the extent 158. If AV data is to be recorded next, a linking loss extent 552, a real-time extent $RT_2$ and an empty extent 82 are recorded. In order to ensure that this disk will be able to be reproduced by a read-only apparatus, a linking loss area 163 and a file structure area 164 are recorded, and a border out (not shown) is recorded within a border zone 165. In the case of appending AV data as described with reference to FIGS. 13A to 13D, the VOBU 554 is read from the last region of the real-time extent $RT_2$, and the data recorded in the remaining pre-allocated area $A_2$ is recorded in the copy area 557. The VOBU which has been read is re-encoded and recorded in the re-encode area 558, and appended data is recorded in the added data area 559, which succeeds the re-encode area 558.

When recording the real-time extent $RT_2^*$, the linking loss extent 555 and the empty extent $E_3$ are recorded. If a buffer underrun occurs during the recording of the real-time extent $RT_2^*$, a linking gap is formed, although not shown in FIG. 15. In the case of sequential recording media such as DVD-R disks and CD-R disks, the files are managed based on a VAT system which is defined under the UDF specification. Therefore, a file structure area 170 is recorded at the end of the recorded area on the disk. The data recorded as described above has the same structure as that described With reference to FIG. 17.

In the file structure area 170, a file entry 181 for a ROOT directory, a file entry 182 for a REALTIME directory, a file entry 183 for a VIDEO.VRO file, a file entry 184 for the FILEA.DAT file, the ROOT directory 185, the REALTIME directory 186, a VAT 187, and a VAT ICB 188 are recorded. The file entry 151 is management information for managing the attribution information and the location information of the ROOT directory 185. As a ROOT directory file, a file identifier descriptor is recorded, although not shown in FIG. 15. The file identifier descriptor includes location information of the file entries 184 and 182 for the FILEA.DAT file and the REALTIME directory, which are created under the ROOT directory 185.

The file entry 184 includes the location information of the extent 158 in which this file is recorded. The file entry 182 includes the location information of the REALTIME directory file, which is composed of a file identifier descriptor. The file identifier descriptor includes the location information of the file entry 183 for the VIDEO.VRO file, which is created under the REALTIME directory 156. The file entry 183 includes the location information of the real-time extents $RT_1$ to $RT_2^*$ in which AV data is recorded.

The attribute information which is recorded in the file entry for a real-time file is the same as that described in Example 1 with reference to FIGS. 7A to 7C. However, in the case of a DVD-R disk, it is unnecessary to register empty extents in real-time files because a DVD-R disk has no defective management mechanism associated therewith.

Next, a method for reproducing AV data from the information recording medium illustrated in FIG. 15 in accordance with the block structure illustrated in FIG. 9 and the flowchart illustrated in FIG. 8 will be described. The reproduction method is the same as that described in Example 1. The optical disk drive 807, which satisfies the access performance of the playback reference model, is capable of reading data at a predetermined data transfer rate Vin. The data buffer memory 852 has a size which is equal to or greater than that of the buffer memory 303 of the playback reference model.

The file structure processing section 846 causes the volume structure area 152 and the file structure area 170 to be read to the file structure memory 851 for analysis. Among the data which has been read, the location information and attribute information of real-time extents are stored in the file structure memory 851 (Step S901).

The file structure processing section 846 determines whether or not this file is a real-time file, and confirms whether or not the real-time extents are positioned so as to satisfy the real-time reproduction condition (Step S902).

In the case where the file is a real-time file, the reproduction mode informing section 850 informs the allocation parameters which are stored in the allocation parameter memory 803 to the optical disk drive 807 (Step S903). The data read section 849 issues a reproduction command for AV data to the optical disk drive 807 (Step S904).

In accordance with the reproduction command issued at Step S904, the optical disk drive 807 reads AV data from the real-time extents $RT_1$ and $RT_2^*$. Even if an error occurs during data reproduction due to reproduction from a linking gap, continuous data reproduction is performed without performing any recovery process. The data which has been read is subjected to ECC processing, temporarily transferred to the data buffer memory 852, so that video data and audio data are reproduced on the TV set 812 via the decoder 811 (Step S905).

In the case where the file is a general file, the data read section 849 issues a reproduction command for general data to the optical disk drive 807 (Step S906).

In accordance with the issued reproduction command for general data, the optical disk drive 807 reads data. The data which has been read is temporarily transferred to the data buffer memory 852 (Step S907).

It will be appreciated that the recording method according to the present example of the invention, which involves copying a recorded area to an unrecorded area and re-encoding VOBUs in order to allocate pre-allocated areas so that the playback reference model will not experience a buffer underflow when reproducing a real-time file, can be applied not only to write-once optical disks but also rewritable optical disks.

Figure 11:
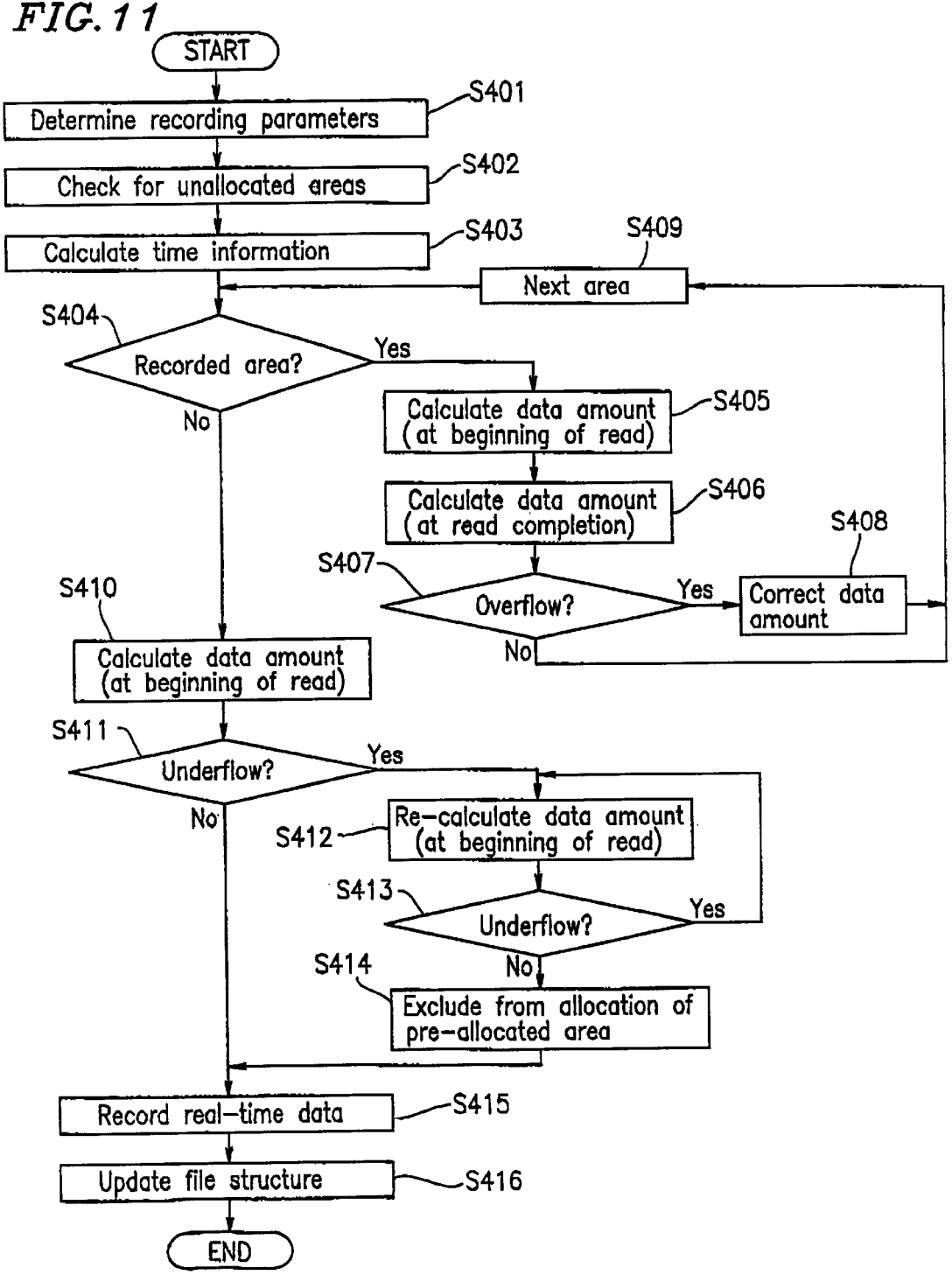
FIG. 11 is a flowchart illustrating a recording method according to Example 2 of the present invention.

In the case where the recording method according to the present invention is applied to a rewritable optical disk, a plurality of unallocated areas are searched for at Step S402 shown in FIG. 11. In that case, the recording method described in Example 2 is applied to the last real-time extent of a previously-recorded real-time file and the first real-time extent that is newly-allocated; and the recording method described in Example 1 is applied to the selection as to which one of the plurality of newly-searched areas should be selected.

Although FIG. 10B illustrates an example in which the access performance for a DVD-R disk is defined based on four categories of access distances, the transition in data amount with the buffer can be more accurately calculated by defining the access performance based on e.g., five or six access distance categories.

Although AV data which has been compressed in the MPEG format is illustrated above, it will be appreciated that the effects of the present invention can also be attained when applied to non-compressed, high quality audio data that has been subjected to high-sampling, or transport streams which are transferred via digital TV broadcasting.

Although the above examples illustrated linking loss extents which are sized at 32 KB, they may alternatively sized at 2 KB. In this case, the first sector of an ECC block will be a linking loss extent, whereas the other 15 sectors can be used for recording data, so that the data recording efficiency will be improved by 15 sectors. However, the error correction ability for data within each ECC block will be correspondingly reduced.

It will be appreciated that the present invention is also applicable to a DVD-RW, in which a linking gap within a linking sector is positioned at the 15th byte to the 17th byte in a first sync frame, and a runout area is composed of a sync portion in the first sync frame and 16 bytes of a data portion. In particular, by recording a linking loss extent prior to the recording of real-time data, it will be possible to secure the reliability of the first data of each real-time extent, and continuous data recording/reproduction abilities can be realized by forming a linking gap within the real-time extent, while minimizing the deterioration in data reliability.

The above examples illustrates instances where real-time data is recorded in a runout area which is positioned within a real-time extent. However, it is possible to provide a simplified optical disk drive by recording 00h data in a runout area without implementing this particular function. Although data reliability within each linking lose extent will deteriorate, it is still possible to continuously record real-time data.

Although FIG. 15 illustrates the case where the linking loss extent 555 is positioned outside the border zone 165, it will be appreciated that the effects of the present invention can also be attained in the case where the linking loss extent 555 is recorded in a portion of the border zone 165.

Thus, according to the present invention, it is possible to provide an information recording medium which permits continuous reproduction of real-time data carried on a recordable optical disk; a recording method and a reproduction method for such an information recording medium; and an information recording apparatus and an information reproduction apparatus for such an information recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording medium for recording a real-time file containing real-time data in such a manner that the real-time data is continuously reproducible by a playback reference model, the real-time data comprising at least one of video data and audio data, wherein the playback reference model includes:

a pickup for reading the real-time data from the information recording medium; a buffer memory for temporarily storing the real-time data read by the pickup; and a decoder module for reading the real-time data from the buffer memory for processing, wherein the information recording medium comprises a volume space for at least recording in sectors a file comprising data and file management information for managing the file; the real-time data is recorded in N real-time extents (where N is an integer which is equal to or greater than 2) each of which is allocated with logically contiguous sectors within the volume space; and an (i+1)th real-time extent (where i is an integer which satisfies $1 \leq i < N$) among the real-time extents is positioned at a position satisfying a real-time reproduction condition defined as:

$$B(i)=B(i-1)+D(i)-\text{Vout} \times T(i) \geq 0,$$

wherein:

T(i) represents a time required for the pickup to access from an end of an ith real-time extent to a beginning of the (i+1)th real-time extent;

B(i) represents an amount of data having been stored in the buffer memory when the pickup accesses the beginning of the (i+1)th real-time extent, assuming that B(0)=0, D(i) represents an increase in the amount of data having been stored in the buffer memory responsive to the pickup reading the data from the ith real-time extent, such that $D(i)=(\text{Vin}-\text{Vout}) \times S(i)/\text{Vin}$, wherein D(i) is corrected at least to a value equal to or smaller than M−B(i−1) when B(i−1)+D(i)>M, where M represents a size of the buffer memory;

Vout represents a data transfer rate when the data is transferred from the buffer memory to the decoder module;

Vin represents a data transfer rate when the data is read from each of the real-time extents by the pickup and transferred to the buffer memory; and S(i) represents a data size of the ith real-time extent.

2. A method for recording a real-time file containing real-time data on an information recording medium in such a manner that the real-time data is continuously reproducible by a playback reference model, the real-time data comprising at least one of video data and audio data, wherein the playback reference model includes:

a pickup for reading the real-time data from the information recording medium; a buffer memory for temporarily storing the real-time data read by the pickup; and a decoder module for reading the real-time data from the buffer memory for processing, wherein the information recording medium comprises a volume space for at least recording in sectors a file comprising data and file management information for managing the file, wherein the method comprises the steps of:

searching for N areas (where N is an integer which is equal to or greater than 2) satisfying a real-time reproduction condition from among a plurality of logically contiguous unused areas within the volume space, each of the areas being designated as a pre-allocated area, an (i+1)th pre-allocated area (where i is an integer which satisfies 1≦i<N) among the pre-allocated areas satisfying the real-time reproduction condition being defined as:

$$B(i)=B(i-1)+D(i)-Vout \times T(i) \geq 0,$$

wherein:

T(i) represents a time required for the pickup to access from an end of an ith pre-allocated area to a beginning of the (i+1)th pre-allocated area;

B(i) represents an amount of data having been stored in the buffer memory when the pickup accesses the beginning of the (i+1)th pre-allocated area, assuming that B(0)=0, D(i) represents an increase in the amount of data having been stored in the buffer memory responsive to the pickup reading the real-time data from the ith pre-allocated area, such that D(i)=(Vin−Vout)×S(i)/Vin, wherein D(i) is corrected at least to a value equal to or smaller than M−B(i−1) when B(i−1)+D(i)>M, where M represents a size of the buffer memory;

Vout represents a data transfer rate when the data is transferred from the buffer memory to the decoder module;

Vin represents a data transfer rate when the data is read from each of the pre-allocated areas by the pickup and transferred to the buffer memory; and S(i) represents a data size of the ith pre-allocated area;

recording the real-time data in the pre-allocated area;

designating a set of logically contiguous sectors in which real-time data is recorded as a real-time extent; and recording the file management information for managing the real-time data in the volume space.

3. An information recording apparatus for recording a real-time file containing real-time data on an information recording medium in such a manner that the real-time data is continuously reproducible by a playback reference model, the real-time data comprising at least one of video data and audio data, wherein the playback reference model includes:

a pickup for reading the real-time data from the information recording medium; a buffer memory for temporarily storing the real-time data read by the pickup; and a decoder module for reading the real-time data from the buffer memory for processing, wherein the information recording medium comprises a volume space for at least recording in sectors a file comprising data and file management information for managing the file;

wherein the information recording apparatus comprises a file system processing section for: searching for N areas (where N is an integer which is equal to or greater than 2) satisfying a real-time reproduction condition from among a plurality of logically contiguous unused areas within the volume space, each of the areas being designated as a pre-allocated area; recording the real-time data in the pre-allocated area; designating a set of logically contiguous sectors in which real-time data is recorded as a real-time extent; and recording the file management information for managing the real-time data in the volume space, wherein an (i+1)th pre-allocated area (where i is an integer which satisfies 1≦i<N) among the pre-allocated areas is positioned at a position satisfying a real-time reproduction condition defined as:

$$B(i)=B(i-1)+D(i)-Vout \times T(i) \geq 0,$$

wherein:

T(i) represents a time required for the pickup to access from an end of an ith pre-allocated area to a beginning of an (i+1)th pre-allocated area among the pre-allocated areas;

B(i) represents an amount of data having been stored in the buffer memory when the pickup accesses the beginning of the (i+1)th pre-allocated area, assuming that B(0)=0, D(i) represents an increase in the amount of data having been stored in the buffer memory responsive to the pickup reading the real-time data from the ith pre-allocated area, such that D(i)=(Vin−Vout)×S(i)/Vin, wherein D(i) is corrected at least to a value equal to or smaller than M−B(i−1) when B(i−1)+D(i)>M, where M represents a size of the buffer memory;

Vout represents a data transfer rate when the data is transferred from the buffer memory to the decoder module;

Vin represents a data transfer rate when the data is read from each of the pre-allocated areas by the pickup and transferred to the buffer memory; and S(i) represents a data size of the ith pre-allocated area.

4. A system controller for an information recording apparatus for recording a real-time file containing real-time data on an information recording medium in such a manner that the real-time data is continuously reproducible by a playback reference model, the real-time data comprising at least one of video data and audio data, wherein the playback reference model includes:

a pickup for reading the real-time data from the information recording medium; a buffer memory for temporarily storing the real-time data read by the pickup; and a decoder module for reading the real-time data from the buffer memory for processing, wherein the information recording medium comprises a volume space for at least recording in sectors a file comprising data and file management information for managing the file;

wherein the system controller comprises a file system processing section for: searching for N areas (where N is an integer which is equal to or greater than 2) satisfying a real-time reproduction condition from among a plurality of logically contiguous unused areas within the volume space, each of the areas being designated as a pre-allocated area; recording the real-time data in the pre-allocated area; designating a set of logically contiguous sectors in which real-time data is recorded as a real-time extent; and recording the file management information for managing the real-time data in the volume space, wherein an (i+1)th pre-allocated area (where i is an integer which satisfies 1≦i<N) among the pre-allocated areas is positioned at a position satisfying a real-time reproduction condition defined as:

$$B(i)=B(i-1)+D(i)-V_{\text{out}} \times T(i) \geq 0,$$

wherein:

T(i) represents a time required for the pickup to access from an end of an ith pre-allocated area to a beginning of an (i+1)th pre-allocated area among the pre-allocated areas;

B(i) represents an amount of data having been stored in the buffer memory when the pickup accesses the beginning of the (i+1)th pre-allocated area, assuming that B(0)=0, D(i) represents an increase in the amount of data having been stored in the buffer memory responsive to the pickup reading the real-time data from the ith pre-allocated area, such that D(i)=(Vin−Vout)×S(i)/Vin, wherein D(i) is corrected at least to a value equal to or smaller than M−B(i−1) when B(i−1)+D(i)>M, where M represents a size of the buffer memory;

Vout represents a data transfer rate when the data is transferred from the buffer memory to the decoder module;

Vin represents a data transfer rate when the data is read from each of the pre-allocated areas by the pickup and transferred to the buffer memory; and S(i) represents a data size of the ith pre-allocated area.

5. A method for reproducing real-time data from an information recording medium on which a real-time file containing the real-time data is recorded in such a manner that the real-time data is continuously reproducible by a playback reference model, the real-time data comprising at least one of video data and audio data, wherein the playback reference model includes:

a pickup for reading the real-time data from the information recording medium; a buffer memory for temporarily storing the real-time data read by the pickup; and a decoder module for reading the real-time data from the buffer memory for processing, wherein the information recording medium comprises a volume space for at least recording in sectors a file comprising data and file management information for managing the file, wherein the real-time data is recorded in N real-time extents (where N is an integer which is equal to or greater than 2) each of which is allocated with logically contiguous sectors within the volume space; and an (i+1)th real-time extent (where i is an integer which satisfies 1≦i<N) among the real-time extents is positioned at a position satisfying a real-time reproduction condition defined as:

$$B(i)=B(i-1)+D(i)-V_{\text{out}} \times T(i) \geq 0,$$

wherein:

T(i) represents a time required for the pickup to access from an end of an ith real-time extent to a beginning of the (i+1)th real-time extent;

B(i) represents an amount of data having been stored in the buffer memory when the pickup accesses the beginning of the (i+1)th real-time extent, assuming that B(0)=0, D(i) represents an increase in the amount of data having been stored in the buffer memory responsive to the pickup reading the data from the ith real-time extent, such that D(i)=(Vin−Vout)×S(i)/Vin, wherein D(i) is corrected at least to a value equal to or smaller than M−B(i−1) when B(i−1)+D(i)>M, where M represents a size of the buffer memory;

Vout represents a data transfer rate when the data is transferred from the buffer memory to the decoder module;

Vin represents a data transfer rate when the data is read from each of the real-time extents by the pickup and transferred to the buffer memory; and S(i) represents a data size of the ith real-time extent, wherein the method comprises the steps of:

reproducing the real-time file from the information recording medium by means of a disk drive;

acquiring location information of each of the real-time extents and identification information indicating that the real-time extents are positioned in accordance with the real-time reproduction condition;

reading the real-time data from the real-time extents at a data transfer rate which is equal to or greater than Vin of the playback reference model;

temporarily storing the real-time data which has been read in the buffer memory;

reading the real-time data stored in the buffer memory and decoding the data in a decoder; and accessing a next real-time extent within the time T(i).

6. An information reproduction apparatus for reproducing real-time data from an information recording medium on which a real-time file containing the real-time data is recorded in such a manner that the real-time data is continuously reproducible by a playback reference model, the real-time data comprising at least one of video data and audio data, wherein the playback reference model includes:

a pickup for reading the real-time data from the information recording medium; a first buffer memory for temporarily storing the real-time data read by the pickup; and a decoder module for reading the real-time data from the first buffer memory for processing, wherein the information recording medium comprises a volume space for at least recording in sectors a file comprising data and file management information for managing the file, wherein the real-time data is recorded in N real-time extents (where N is an integer which is equal to or greater than 2) each of which is allocated with logically contiguous sectors within the volume space; and an (i+1)th real-time extent (where i is an integer which satisfies 1≦i<N) among the real-time extents is positioned at a position satisfying a real-time reproduction condition defined as:

$$B(i)=B(i-1)+D(i)-V_{\text{out}} \times T(i) \geq 0,$$

wherein:

T(i) represents a time required for the pickup to access from an end of an ith real-time extent to a beginning of the (i+1)th real-time extent;

B(i) represents an amount of data having been stored in the first buffer memory when the pickup accesses the beginning of the (i+1)th real-time extent, assuming that B(0)=0, D(i) represents an increase in the amount of data having been stored in the first buffer memory responsive to the pickup reading the data from the ith real-time extent, such that $D(i)=(Vin-Vout)\times S(i)/Vin$, wherein $D(i)$ is corrected at least to a value equal to or smaller than $M-B(i-1)$ when $B(i-1)+D(i)>M$, where M represents a size of the first buffer memory;

Vout represents a data transfer rate when the data is transferred from the first buffer memory to the decoder module;

Vin represents a data transfer rate when the data is read from each of the real-time extents by the pickup and transferred to the first buffer memory; and S(i) represents a data size of the ith real-time extent, wherein the information reproduction apparatus comprises:

a file structure processing section for acquiring location information of each of the real-time extents and identification information indicating that the real-time extents are positioned in accordance with the real-time reproduction condition;

a data reproducer for reading the real-time data from the real-time extents at a predetermined data transfer rate;

a second buffer memory for temporarily storing the real-time data which has been read; and a decoder for reading the real-time data stored in the second buffer memory and decoding the real-time data, wherein a data reproduction performance which is determined as a function of an access performance and a data transfer rate of the data reproducer and a size of the second buffer memory satisfies a performance for continuously reproducing the real-time data from the real-time extents which are positioned in accordance with the real-time reproduction condition.

* * * * *

UNITED STATES PATENT AND TRADEMARK OFFICE
CERTIFICATE OF CORRECTION

PATENT NO. : 6,839,504 B1
DATED : January 4, 2005
INVENTOR(S) : Yoshiho Gotoh et al.

It is certified that error appears in the above-identified patent and that said Letters Patent is hereby corrected as shown below:

<u>Title page,</u>
Item [57], ABSTRACT,
Line 16, "$(1+1)^{th}$" should read -- $(i + 1)^{th}$ --

Signed and Sealed this

Third Day of May, 2005

JON W. DUDAS
*Director of the United States Patent and Trademark Office*